United States Patent
Song et al.

(10) Patent No.: US 9,294,605 B1
(45) Date of Patent: Mar. 22, 2016

(54) MOBILE TERMINAL AND METHOD FOR CONTROLLING THE SAME

(71) Applicant: LG ELECTRONICS INC., Seoul (KR)

(72) Inventors: Yoomee Song, Seoul (KR); Sooyoung Her, Seoul (KR); Taekon Lee, Seoul (KR); Minkyoung Chang, Seoul (KR); Jeongyun Heo, Seoul (KR); Hyungtae Jang, Seoul (KR); Jungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/633,595

(22) Filed: Feb. 27, 2015

(30) Foreign Application Priority Data

Sep. 12, 2014 (KR) .................... 10-2014-0121288

(51) Int. Cl.
*H04B 1/38* (2015.01)
*H04M 1/00* (2006.01)
*H04M 1/725* (2006.01)

(52) U.S. Cl.
CPC .................. *H04M 1/72519* (2013.01)

(58) Field of Classification Search
CPC .................. H04M 1/72519; H04M 1/72583; H04M 1/72522; H04M 1/72547; H04M 1/0214

See application file for complete search history.

(56) References Cited

U.S. PATENT DOCUMENTS

| 7,054,666 | B2 * | 5/2006 | Shibuya | H04M 1/72519 455/566 |
|---|---|---|---|---|
| 2006/0253801 | A1 * | 11/2006 | Okaro | G06F 3/0482 715/810 |
| 2008/0020810 | A1 * | 1/2008 | Park | G06F 3/0362 455/575.1 |
| 2008/0178104 | A1 * | 7/2008 | Kim | H04M 1/72522 715/764 |

* cited by examiner

*Primary Examiner* — Kashif Siddiqui
(74) *Attorney, Agent, or Firm* — KED & Associates LLP

(57) ABSTRACT

A mobile terminal may display at least one content. A first function related to the content may be executed to display a first result screen upon receiving a first input, and a second function related to the first result screen is executed to display a second result screen upon receiving a second input following the first input. Second content of the second result screen, related to first content of the first result screen, which corresponds to an end point of the first input, may be displayed at a substantially center area.

20 Claims, 32 Drawing Sheets

MOBILE TERMINAL AND METHOD FOR CONTROLLING THE SAME

CROSS-REFERENCE TO RELATED APPLICATION

This application claims priority to Korean Patent Application No. 10-2014-0121288, filed Sep. 12, 2014 in Korea, the entire subject matter of which is hereby incorporated by reference.

BACKGROUND

1. Field

Embodiments may relates to a mobile terminal for controlling an application execution screen and a method for controlling the same.

2. Background

Terminals may be classified as mobile/portable terminals or stationary terminals according to mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality that supports game playing, while other terminals are configured as multimedia players. More recently, mobile terminals have been configured to receive broadcast and multicast signals that permit viewing of content, such as videos and television programs.

Efforts are ongoing to support and increase functionality of mobile terminals. Such efforts include software and hardware improvements, as' well as changes and improvements in structural components.

A terminal can execute one function corresponding to one input, and when a same input is continuously received, the terminal may dynamically execute a function corresponding thereto.

However, to execute two or more different functions, the terminal may need to receive two or more different inputs. More particularly, when a user intends to search for desired information through a display of a small terminal, the user may need to repeat a plurality of scrolling operations and input operations for magnifying or reducing the screen.

BRIEF DESCRIPTION OF THE DRAWINGS

Arrangements and embodiments may be described in detail with reference to the following drawings in which like reference numerals refer to like elements and wherein:

FIGS. 3 to 19 are views for explaining a method for controlling a mobile terminal in accordance with an example embodiment;

DETAILED DESCRIPTION

Description may now be given in detail according to exemplary embodiments disclosed herein, with reference to the accompanying drawings. For the sake of brief description with reference to the drawings, same or equivalent components may be provided with same reference numbers, and description thereof may not be repeated.

A suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings may be used to help easily understand various technical features and it should be understood that embodiments presented herein are not limited by the accompanying drawings. As such, embodiments should be construed to extend to any alterations, equivalents and substitutes in addition to those that are particularly set out in the accompanying drawings.

It may be understood that although the terms first, second, etc. may be used herein to describe various elements, these elements should not be limited by these terms. These terms are generally only used to distinguish one element from another.

It may be understood that when an element is referred to as being "connected with (or to)" another element, the element can be connected with the other element or intervening elements may also be present. In contrast, when an element is referred to as being "directly connected with (or to)" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, and/or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and/or the like.

By way of non-limiting example only, a further description may be made with reference to particular types of mobile terminals. However, such teachings apply equally to other types of terminals, such as those types noted above. These teachings may also be applied to stationary terminals such as digital TV, desktop computers, and/or 105 the like.

Figure 1A:
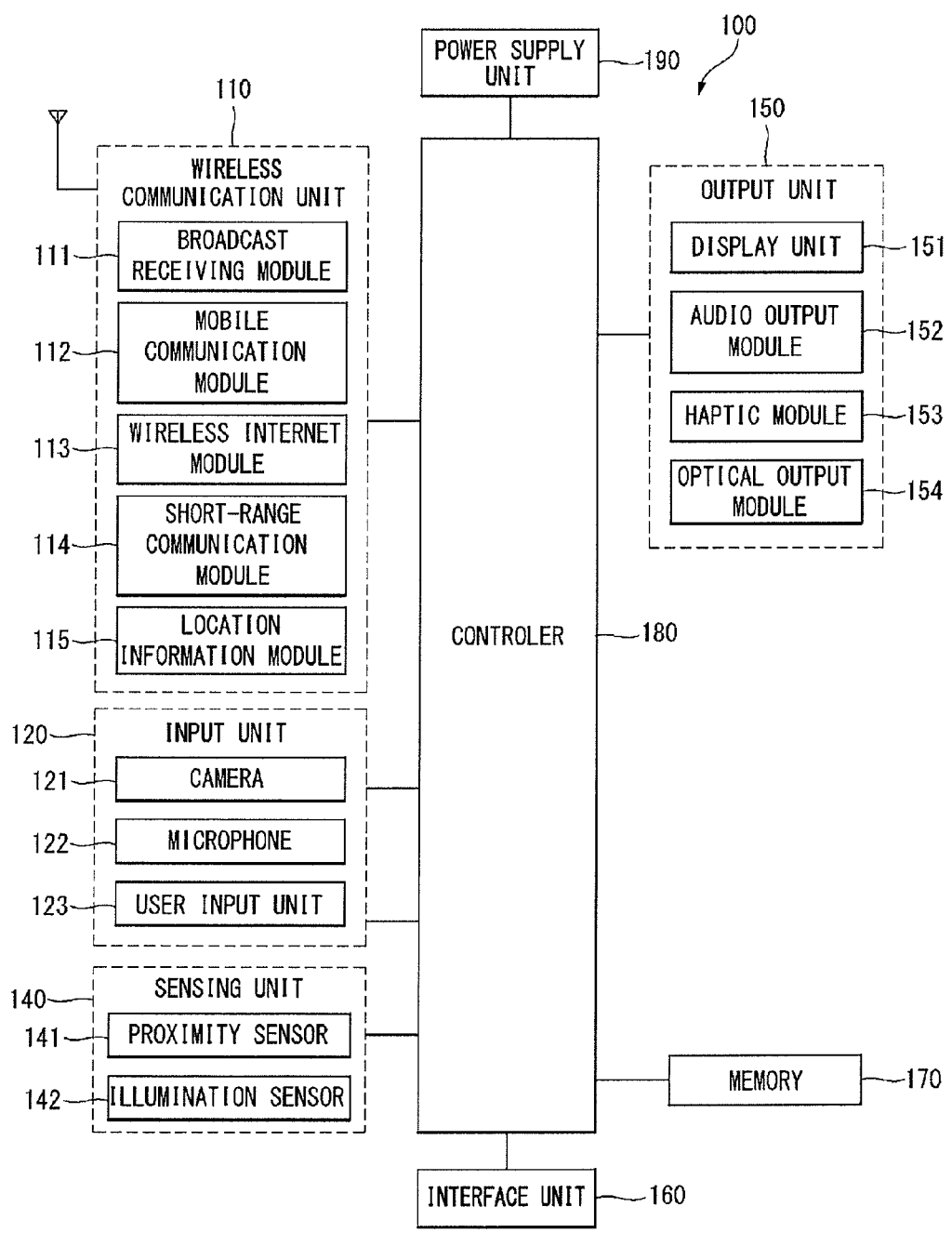
FIG. 1A is a block diagram of a mobile terminal in accordance with the present disclosure.
Figure 1B:
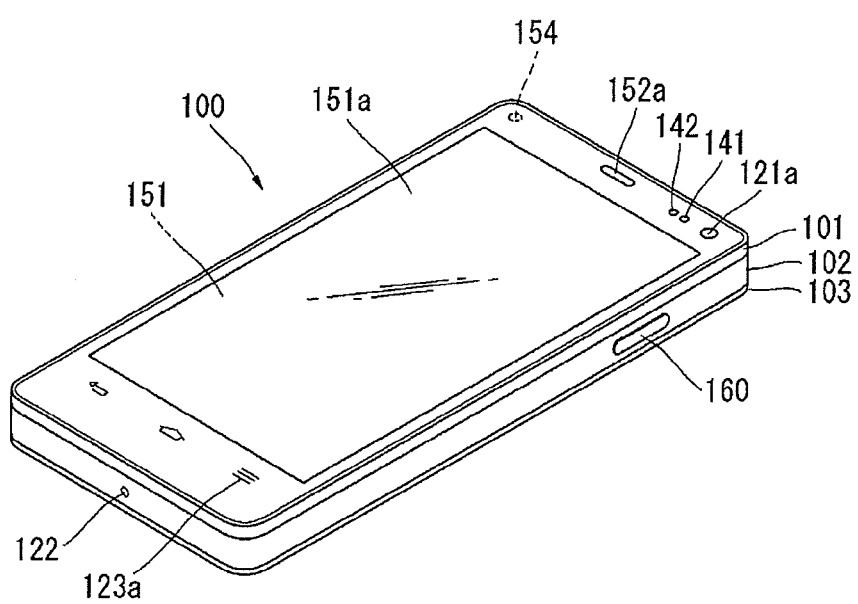
FIGS. 1B and 1C are conceptual views of one example of the mobile terminal viewed from different directions.
Figure 1C:
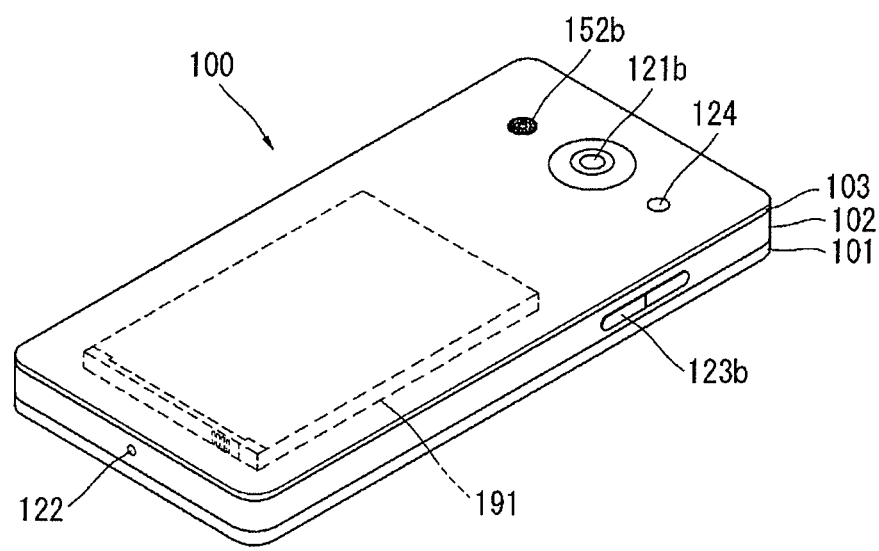

FIG. 1A is a block diagram of a mobile terminal in accordance with the present disclosure. FIGS. 1B and 1C are conceptual views of one example of the mobile terminal viewed from different directions. Other configurations may also be provided.

A mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

As shown in FIG. 1A, the mobile terminal 100 is shown having a wireless communication unit 110 configured with several commonly implemented components. For example, the wireless communication unit 110 may include one or more components that permit wireless communication between the mobile terminal 100 and a wireless communication system or network within which the mobile terminal is located.

The wireless communication unit 110 may include one or more modules that permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules that connect the mobile terminal 100 to one or more networks. To facilitate such communications, the wireless communication unit 110 may include one or more of a broadcast receiving module 111, a mobile communication module 112, a wireless Internet module 113, a short-range communication module 114, and a location information module 115.

The input unit 120 may include a camera 121 for obtaining images or video, a microphone 122, which is one type of audio input device for inputting an audio signal, and a user input unit 123 (e.g., a touch key, a push key, a mechanical key, a soft key, and/or the like) for allowing a user to input information. Data (e g., audio, video, image, and/or the like) is obtained by the input unit 120 and may be analyzed and processed by controller 180 according to device parameters, user commands, and/or combinations thereof.

The sensing unit 140 may be implemented using one or more sensors configured to sense internal information of the mobile terminal, surrounding environment of the mobile terminal, user information, and/or the like. For example, in FIG. 1A, the sensing unit 140 is shown as having a proximity sensor 141 and an illumination sensor 142.

The sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 may be configured to output various types of information, such as audio, video, tactile output, and the like. The output unit 150 is shown having a display unit 151, an audio output module 152, a haptic module 153, and an optical output module 154. The display unit 151 may also be referred to as a display (having a screen).

The display unit 151 may have an inter-layered structure or an integrated structure with a touch sensor in order to facilitate a touch screen. The touch screen may provide an output interface between the mobile terminal 100 and a user, as well as function as the user input unit 123 that provides an input interface between the mobile terminal 100 and the user.

The interface unit 160 may serve as an interface with various types of external devices that can be coupled to the mobile terminal 100. For example, the interface unit 160 may include any of wired or wireless ports, external power supply ports, wired or wireless data ports, memory card ports, ports for connecting a device having an identification module, audio input/output (I/O) ports, video I/O ports, earphone ports, and/or the like. The mobile terminal 100 may perform assorted control functions associated with a connected external device, in response to the external device being connected to the interface unit 160.

The memory 170 may be implemented to store data to support various functions or features of the mobile terminal 100. For example, the memory 170 may be configured to store application programs executed in the mobile terminal 100, data or instructions for operations of the mobile terminal 100, and/or the like. Some of these application programs may be downloaded from an external server via wireless communication. Other application programs may be installed within the mobile terminal 100 at a time of manufacturing or shipping, may be the case for basic functions of the mobile terminal 100 (e.g., receiving a call, placing a call, receiving a message, sending a message, and/or the like). It may be common for application programs to be stored in the memory 170, installed in the mobile terminal 100, and executed by the controller 180 to perform an operation (or function) for the mobile terminal 100.

The controller 180 may function to control overall operation of the mobile terminal 100, in addition to operations associated with the application programs. The controller 180 may provide or process information or functions appropriate for a user by processing signals, data, information and/or the like, which are input or output by the various components depicted in FIG. 1A, or activating application programs stored in the memory 170. As one example, the controller 180 may control some or all of the components shown in FIGS. 1A-1C according to execution of an application program that has been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Various components depicted in FIG. 1A may now be described in more detail. Regarding the wireless communication unit 110, the broadcast receiving module 111 may be configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving two or more broadcast channels, or to support switching among broadcast channels.

The mobile communication module 112 can transmit and/or receive wireless signals to and from one or more network entities. Examples of a network entity include a base station, an external mobile terminal, a server, and the like. Such network entities may form part of a mobile communication network, which is constructed according to technical standards or communication methods for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 may perform such wireless Internet access. As such, the wireless Internet module 113 may cooperate with, or function as, the mobile communication module 112.

The short-range communication module 114 may be configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 may support wireless communications between the mobile terminal 100 and a wireless communication system, communications between the mobile terminal 100 and another mobile terminal 100, and/or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. When the sensed wearable device is a device that is authenticated to communicate with the mobile terminal 100, the controller 180 may cause transmission of data processed in the mobile terminal 100 to the wearable device via the short-range communication module 114. A user of the wearable device may use the data processed in the mobile terminal 100 on the wearable device. For example, when a call is received in the mobile terminal 100, the user may answer the call using the wearable device. When a message is received in the mobile terminal 100, the user can check the received message using the wearable device.

The location information module 115 is configured to detect, calculate, derive or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) that transmits or receives a wireless signal to or from the Wi-Fi module.

The input unit 120 may be configured to permit various types of input to the mobile terminal. Examples of such input may include audio, image, video, data, and user input. Image and video input may be obtained using one or more cameras 121. Such cameras 121 may process image frames of still pictures or video obtained by image sensors in a video or image capture mode. The processed image frames can be displayed on the display unit 151 or stored in memory 170. The cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 may be implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits an input by a user. Such user input may enable the controller 180 to control operation of the mobile terminal 100. The user input unit 123 may include one or more of a mechanical input element (e.g., a key, a button located on a front and/or rear surface or a side surface of the mobile terminal 100, a dome switch, a jog wheel, a jog switch, and/or the like), or a touch-sensitive input, among others. As one example, the touch-sensitive input may be a virtual key or a soft key, that is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, and/or a combination thereof.

The sensing unit 140 may be configured to sense one or more of internal information of the mobile terminal, surrounding environment information of the mobile terminal, user information, or the like. The controller 180 may cooperate with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which may now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141 may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. The touch screen (touch sensor) may also be categorized as a proximity sensor.

The term "proximity touch" may be referred to herein to denote a scenario in which a pointer is positioned to be proximate to the touch screen without contacting the touch screen. The term "contact touch" may be referred to herein to denote the scenario in which a pointer makes physical contact with the touch screen. For the position corresponding to the proximity touch of the pointer relative to the touch screen, such position may correspond to a position where the pointer is perpendicular to the touch screen. The proximity sensor 141 may sense proximity touch, and proximity touch patterns (e.g., distance, direction, speed, time, position, moving status, and the like).

The controller 180 may process data corresponding to proximity touches and proximity touch patterns sensed by the proximity sensor 141, and cause output of visual information on the touch screen. Additionally, the controller 180 can control the mobile terminal 100 to execute different operations or process different data according to whether a touch with respect to a point on the touch screen is either a proximity touch or a contact touch.

A touch sensor can sense a touch applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object may be used to apply a touch input to the touch sensor. Examples of touch objects include a finger, a touch pen, a stylus pen, a pointer, and/or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. The touch controller may be a component separate from the controller 180, the controller 180, and/or combinations thereof.

In some embodiments, the controller 180 may execute the same or different controls according to a type of touch object that touches the touch screen or a touch key provided in addition to the touch screen. Whether to execute the same or different control according to the object that provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and/or the like.

An ultrasonic sensor may be implemented to recognize position information relating to a touch object using ultrasonic waves. The controller 180 may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this information. For example, the position of the wave generation source may be calculated using the time difference from the time that the ultrasonic wave reaches the sensor based on the light as a reference signal.

The camera 121 may include at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal that changes according to the quantity of applied light. The photo sensor may calculate the coordinates of the physical object according to variation of light to thus obtain position information of the physical object.

The display unit 151 may be configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A stereoscopic display unit may employ a stereoscopic display scheme such as a stereoscopic scheme (a glass scheme), an auto-stereoscopic scheme (glassless scheme), a projection scheme (holographic scheme), and/or the like.

The audio output module 152 may be configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and/or the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, and/or the like.

A haptic module 153 can be configured to generate various tactile effects that a user feels, perceive, or otherwise experience. An example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 may serve as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating authority of using the mobile terminal 100 and may include a user identity module (UIM), a subscriber identity module (SIM), a universal subscriber identity module (USIM), and the like. Additionally, the device having the identification module (also referred to as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (e.g., phonebook, messages, still images, videos, etc.). The memory 170 may store data related to various patterns of vibrations and audio that are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and/or the like. The mobile terminal 100 may also operate in relation to a network storage device that performs the storage function of the memory 170 over a network, such as the Internet.

The controller 180 may control general operations of the mobile terminal 100. For example, the controller 180 may set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. Additionally, the controller 180 can control one or a combination of those components in order to implement various exemplary embodiments disclosed herein.

The power supply unit 190 may receive external power or provide internal power and supply the appropriate power required for operating respective elements and components included in the mobile terminal 100. The power supply unit 190 may include a battery, which may be rechargeable or detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method that is based on magnetic induction or a magnetic resonance coupling method that is based on electromagnetic resonance.

Various embodiments described herein may be implemented in a computer-readable medium, a machine-readable medium, or similar medium using, for example, software, hardware, and/or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (e.g., bar-type, watch-type, glasses-type, and the like). However, such teachings with regard to a particular type of mobile terminal may apply to other types of mobile terminals as well.

The mobile terminal 100 may include a case (e.g., frame, housing, cover, and the like) forming an appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. A window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 may be externally exposed.

As shown, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal having a uni-body is formed in such a manner that synthetic resin or metal extends from a side surface to a rear surface.

The mobile terminal 100 may include a waterproofing unit for preventing introduction of water into the terminal body. For example, the waterproofing unit may include a waterproofing member that is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within teachings of the present disclosure. Some components may be omitted or rearranged. For example, the first manipulation unit 123a may be located on another surface of the terminal body, and the second audio output module 152b may be located on the side surface of the terminal body.

The display unit 151 may output information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, that can implement the same or different display technology. For example, a plurality of the display units 151 may be arranged on one side, either spaced apart from each other, or these devices may be integrated, or these devices may be arranged on different surfaces.

The display unit 151 may also include a touch sensor that senses a touch input received at the display unit. When a touch is input to the display unit 151, the touch sensor may be configured to sense this touch and the controller 180, may generate a control command or other signal corresponding to the touch. The content that is input in the touching manner may be a text or numerical value, or a menu item that can be indicated or designated in various modes.

The touch sensor may be configured in a form of a film having a touch pattern, disposed between the window 151a and a display on a rear surface of the window 151a, or a metal wire that is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. The touch screen may serve as the user input unit 123. Therefore, the touch screen may replace at least some of the functions of the first manipulation unit 123a.

The first audio output module 152a may be implemented in the form of a speaker to output voice audio, alarm sounds, multimedia audio reproduction, and/or the like.

The window 151a of the display unit 151 may include an aperture to permit audio generated by the first audio output module 152a to pass. An alternative is to allow audio to be released along an assembly gap between the structural bodies (e.g., a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and/or the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but other possible alternatives include a mechanical key, a push key, a touch key, and/or combinations thereof.

Input received at the first and second manipulation units 123a and 123b may be used in various ways. For example, the first manipulation unit 123a may be used by the user to provide an input to a menu, home key, cancel, search, and/or the like, and the second manipulation unit 123b may be used by the user to provide an input to control a volume level being output from the first or second audio output modules 152a or 152b, to switch to a touch recognition mode of the display unit 151, and/or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit a touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at any location of the rear side of the terminal body.

Embodiments that include the rear input unit may implement some or all of functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor that scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (e.g., an earphone, an external speaker, or the like), a port for near field communication (e.g., an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121a may alternatively be located at other locations, and/or made to be moveable in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 may be adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may also be used for implementing a speaker phone mode for call communication.

At least one antenna for wireless communication may be located on the terminal body. The antenna may be installed in the terminal body or formed by the case. For example, an antenna that configures a part of the broadcast receiving module 111 may be retractable into the terminal body. Alternatively, an antenna may be formed using a film attached to an inner surface of the rear cover 103, or a case that includes a conductive material.

The power supply unit 190 for supplying power to the mobile terminal 100 may include a battery 191, which is mounted in the terminal body or detachably coupled to an outside of the terminal body. The battery 191 may receive power via a power source cable connected to the interface unit 160. The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further embodiments may be described in more detail with reference to additional drawing figures. It is understood by those skilled in the art that features can be embodied in several forms without departing from the characteristics thereof.

A description may be provided of embodiments.

Figure 2:
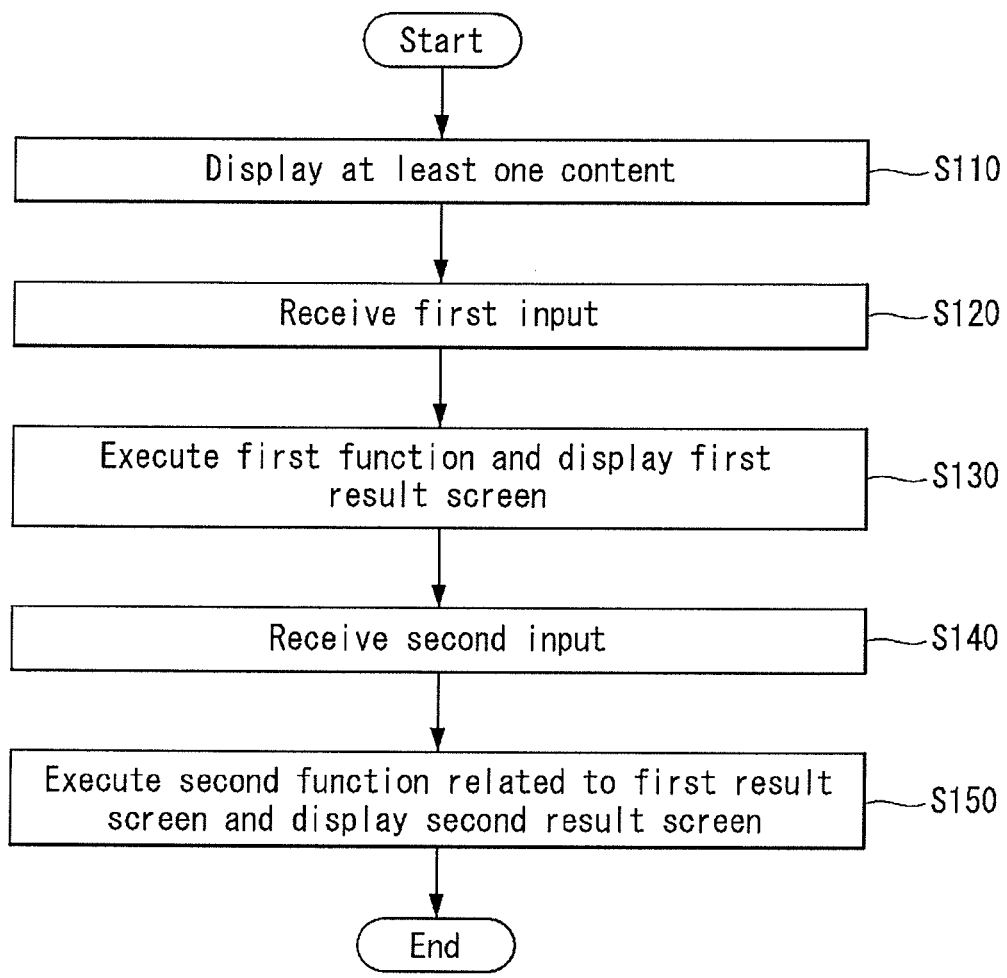
FIG. 2 is a flowchart illustrating a method for controlling a mobile terminal in accordance with an example embodiment.

FIG. 2 is a flowchart illustrating a method for controlling a mobile terminal according to an example embodiment. Other embodiments and configurations may also be provided.

The controller 180 of the mobile terminal may display at least one piece of content on the display unit 151 in operation S110, and receive a first input at the display unit 151 in operation S120.

The controller may execute a specific application and display an execution screen of the specific application on the display unit. The specific application execution screen may include at least one piece of content. Content may refer to a unit item including an image, text, text box, icon, figure and/or the like included in the specific application execution screen. For example, at least one image included in a gallery application execution screen may be defined as content.

The controller may receive the first input applied to the display unit on which the content is displayed. The first input may be continuous touch input in a first diagonal direction and may start from a bezel (or bezel region) of the display unit. The first input may be a touch input applied to a point on the bezel of the display unit and a continuous touch input applied to the touchscreen in the first diagonal direction, which are simultaneously received. More specifically, when a drag input, which starts from the bezel of the display unit and has an angle in a specific range to the horizontal or vertical direction of the touchscreen, is received, the controller may recognize the drag input as the first input.

The controller 180 may execute a first function related to the content and display a first result screen on the display unit 151 upon reception of the first input in operation S130.

The controller may preset the first function corresponding to the first input. The first function may be a function of dynamically changing at least one piece of content upon reception of the first input. For example, the controller can gradually increase or decrease a display scale of the content upon reception of first input. The controller may control the first function in stages using at least one of the length, direction and speed of the first input.

When the first function is controlled in stages according to the first input, the controller may dynamically change and display the first result screen acquired from execution of the first function. For example, when the first function is a function of gradually increasing the content display scale, the controller can gradually increase the size of the content and display the content on the display unit upon reception of the first input. The controller can re-set a method of arranging the content upon change of the content size.

The controller 180 may receive, in operation S140 a second input following the first, and execute, in operation S150, a second function related to the first result screen so as to display a second result screen on the display unit 151 upon reception of the second input.

The controller may receive the second input following the first input in a state that the first input is not released. More specifically, the controller may recognize a continuous touch input, which starts from the end point of the first input and is applied in a second diagonal direction different from the first diagonal direction, as the second input. The second input may be drag input that starts from the end point of the first input and is applied to a direction different from the direction of the first input. Otherwise, the second input may correspond to a touch input applied to a point on the bezel of the display unit and a continuous touch input applied to the touchscreen in the second diagonal direction, which are simultaneously applied.

The controller may execute the second function related to the first result screen and display the second result screen on the display unit upon reception of the second input. The controller may preset the second function corresponding to the second input and set the second function as a function corresponding to the first function. The second function may be a function controlled in stages according to length, direction and speed of the second input.

The controller may execute the second function for content included in the first result screen. More specifically, when the first result screen includes content in a reduced display scale, the controller may execute the second function for the reduced content so as to generate the second result screen. The controller may display, on the display unit, the second result screen acquired by executing the second function for the first result screen displayed on the display unit. When only the second result screen related to part of the first result screen can be displayed on the display unit, the controller may control second content of the second result screen, which corresponds to first content displayed on the end point of the first input, to be displayed at the center of the display unit. Content of the first result screen, which is displayed on the end point of the first input, may be defined as "first content" and content of the second result screen, which corresponds to the first content, may be defined as "second content".

The controller may display an indicator for indicating the first function or the second function corresponding to the first input or the second input at the center of the display unit (or at a substantially center area of the display screen). The controller may provide a guide for controlling the direction or length of the first input or the second input by displaying the indicator in such a manner that the indicator and part of the first or second result screen overlap.

The controller may magnify a thumbnail of specific content displayed at a point to which the first or second input is applied and display the thumbnail along with part of the first or second result screen in an overlapping manner. The controller may magnify the thumbnail of the specific content displayed at the point to which the first or second input is applied and display the magnified thumbnail at the center of the display unit (or at a substantially center area of the display screen) such that content corresponding to a result screen, which is obtained by executing the first or second function according to the first or second input, can be checked in real time.

The controller may execute the second function only when the second input having a predetermined length (or more) is received. More specifically, the controller may move the first content to the center of the display unit (or substantially center area of the display screen) and display the first content thereon when the second input having a length less than the predetermined length is received and move the second content to the center of the display unit (or substantially center area) and display the second content thereon when the second input having a length longer than the predetermined length is received. When the second input having a length longer than the predetermined length is received and then released, the controller may display the second result screen such that the second content is displayed at the center of the display unit or display the second content on the overall area of the display unit.

The controller may scroll the first result screen upon reception of a holding input applied to the end point of the first input between the first input and the second input. More specifically, the controller may recognize an input, which is applied to the end point of the first input and maintained for a predetermined time (or more), as the holding input. The controller may control a scroll speed according to at least one of the speed of the first input, content display scale of the first result screen and a tilting degree of the terminal, upon reception of the holding input.

The controller may repeatedly execute the first or second function when a third input corresponding to the first input and following the second input is received or a fourth input corresponding to the second input and following the third input. The third input may be applied in the first diagonal direction corresponding to the direction of the first input whereas the fourth input may be applied in the second diagonal direction corresponding to the direction of the second input. The third or fourth input may have a length different from the first or second input.

Upon reception of a reverse input of the first or second input immediately after reception of the first or second input, the controller may restore the current state to the previous state prior to execution of the first or second function corresponding to the reverse input. That is, upon reception of a reverse input in a first direction from the end point of the first input to the input point of the first input immediately after reception of the first input, the controller may restore the first result screen to a state prior to execution of the first function according to the reverse input.

FIGS. 3 to 19 are views for explaining a method for controlling a mobile terminal according to an example embodiment. A description may be provided of detailed embodiments with reference to FIGS. 3 to 19.

Figure 3:
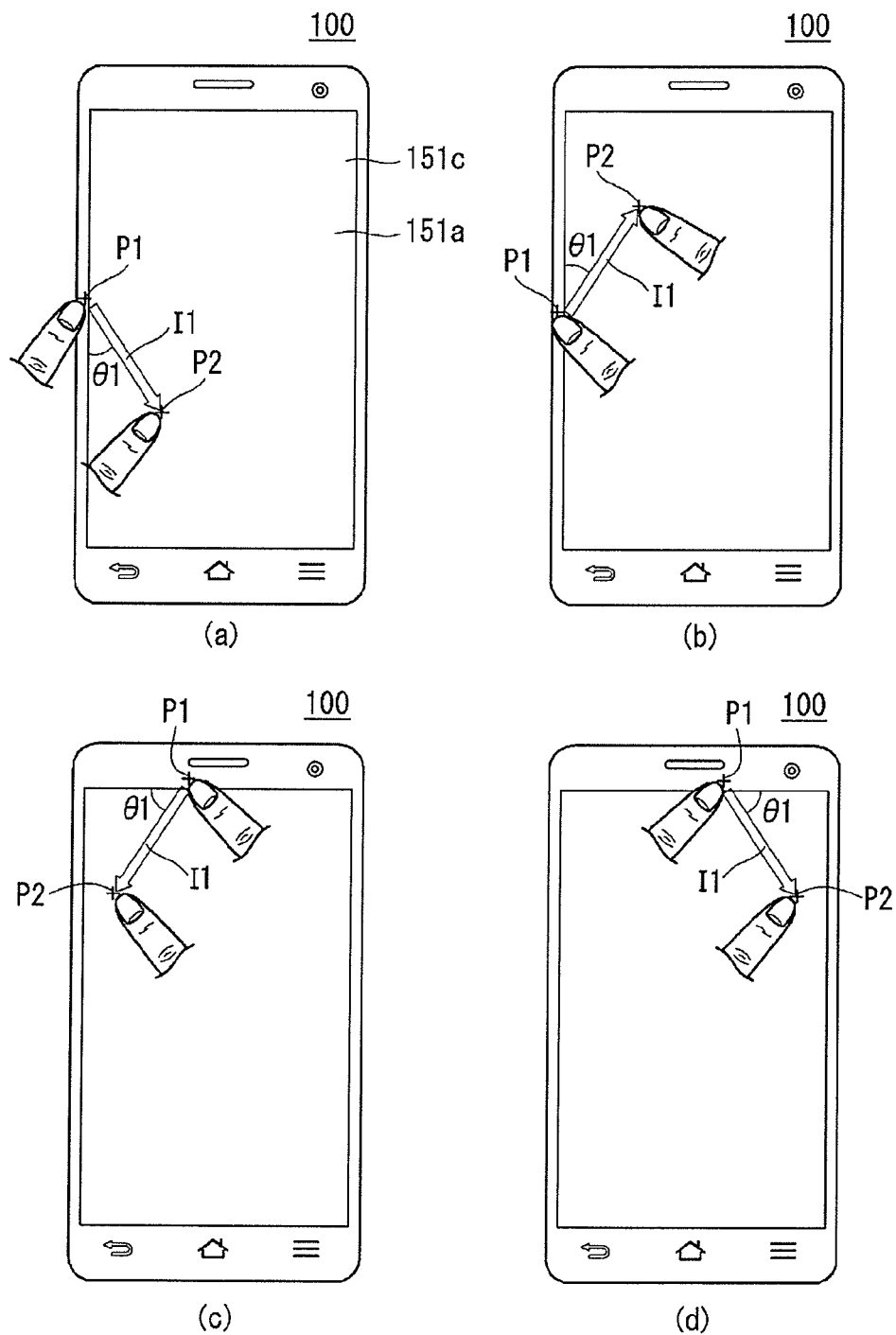
Figure 4:
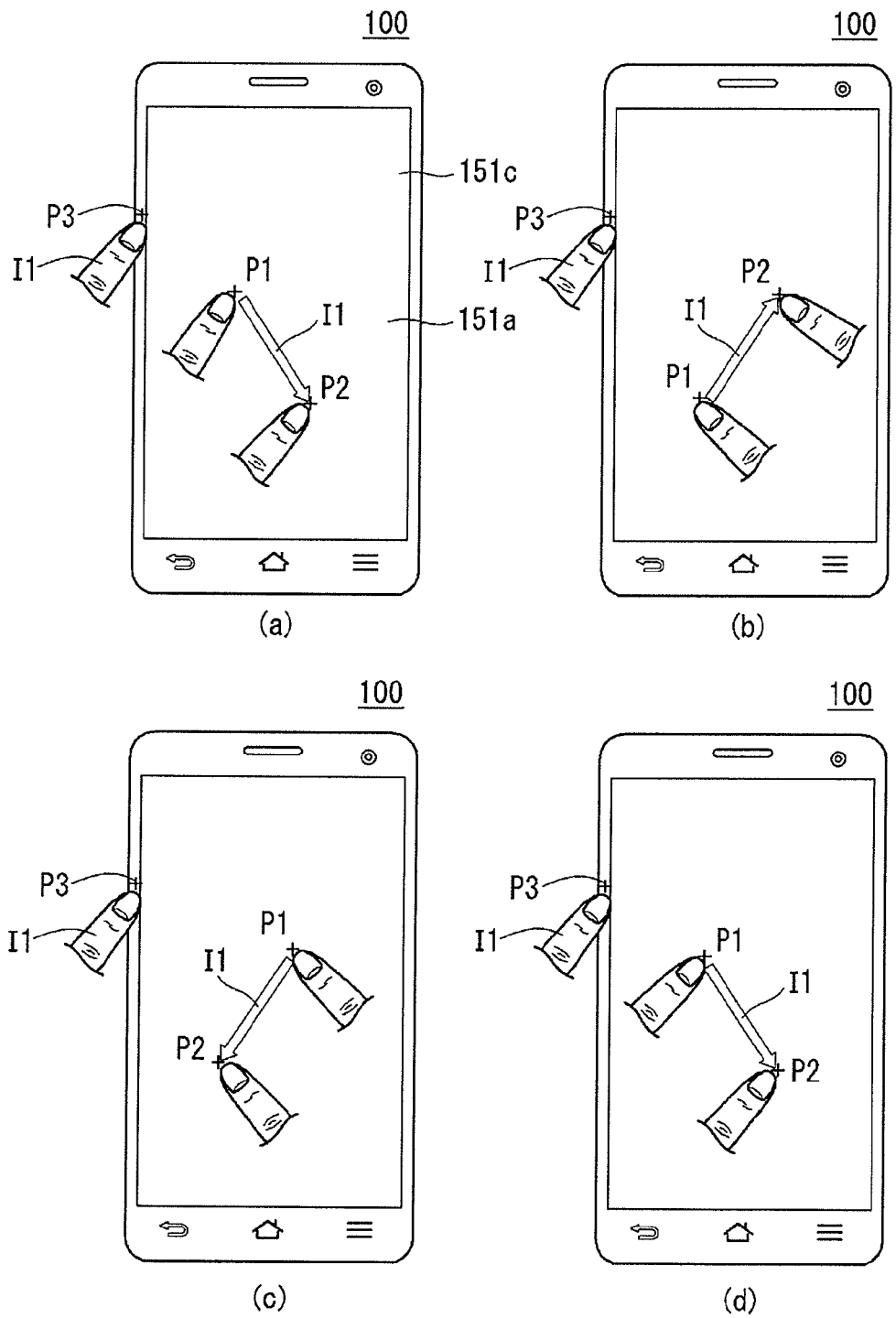

FIGS. 3 and 4 are views for explaining a method of receiving a first input in a method for controlling a mobile terminal according to an example embodiment. Other embodiments and configurations may also be provided.

Referring to FIG. 3, the controller may receive the first input I1 in the first diagonal direction, which starts from the bezel 151c of the display unit and is dragged to the window 151a of the display unit.

The first input I1 may refer to an input in the first diagonal direction, which has a specific length according to the starting point P1 and the end point P2 thereof and is applied at an angle θ1 to the edge of the window 151a of the display unit. The starting point P1 of the first input may include a boundary line of the bezel 151c and the window 151a of the display unit.

The first diagonal direction may refer to one of a right downward direction, a right upward direction, a left downward direction and a left upward direction based on the starting point P1 of the first input I1.

Referring to FIG. 4, the controller may simultaneously receive a touch input, which is applied to a point P3 on the bezel 151c (of the display unit), and a continuous touch input, which is applied to the window 151a (of the display unit) in the first diagonal direction, as the first input I1.

The first input I1 may refer to an input in the first diagonal direction, which starts from point P1 of the window 151a, ends at point P2 of the window 151a, and is received simultaneously with the touch input applied to the point P3 of the bezel 151c. The touch input applied to the point P3 may be received first and maintained during reception of the input in the first diagonal direction.

As described with reference to FIG. 3, the first diagonal direction may refer to one of a right downward direction, a right upward direction, a left downward direction and a left upward direction based on the starting point P1 of the first input.

Figure 5:
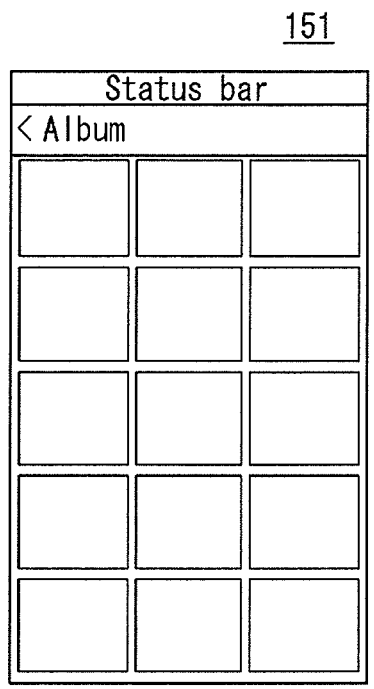
Figure 5:
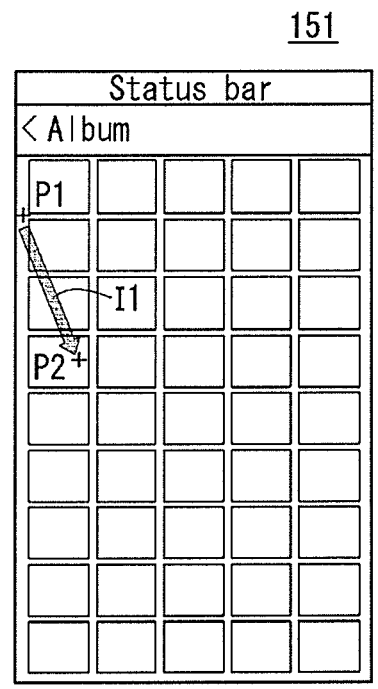
Figure 5:
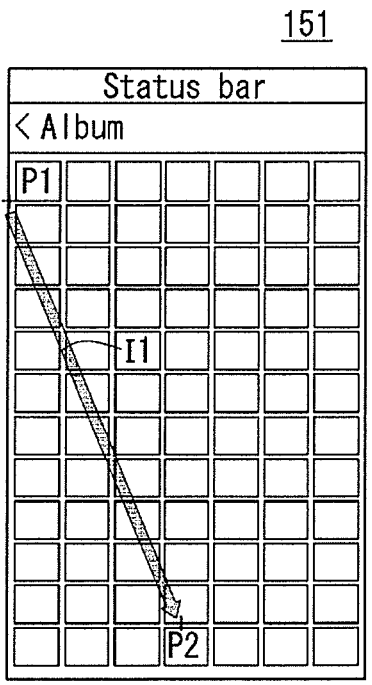
Figure 6:
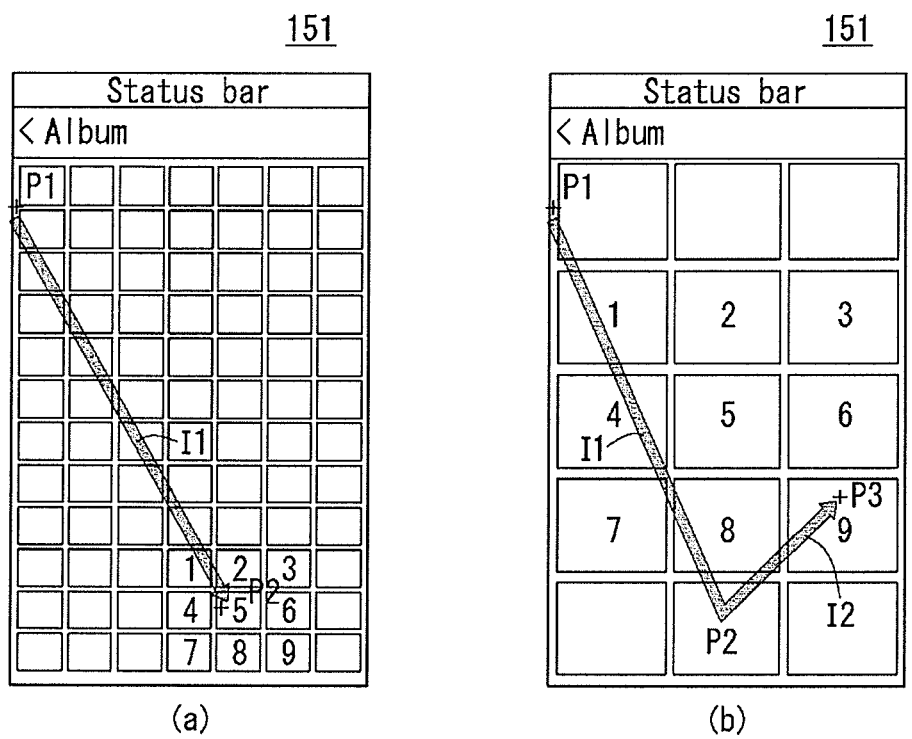
Figure 7:
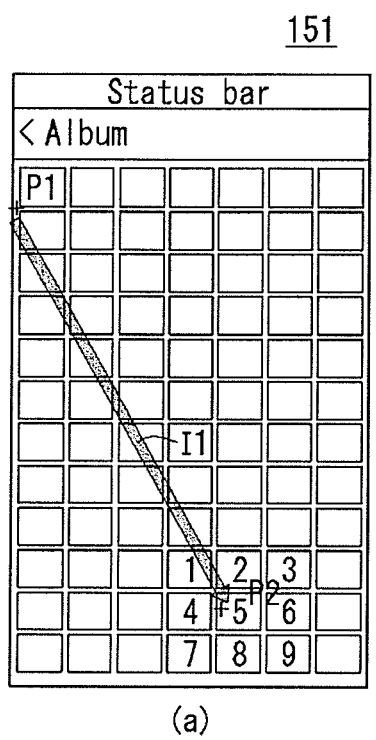
Figure 7:
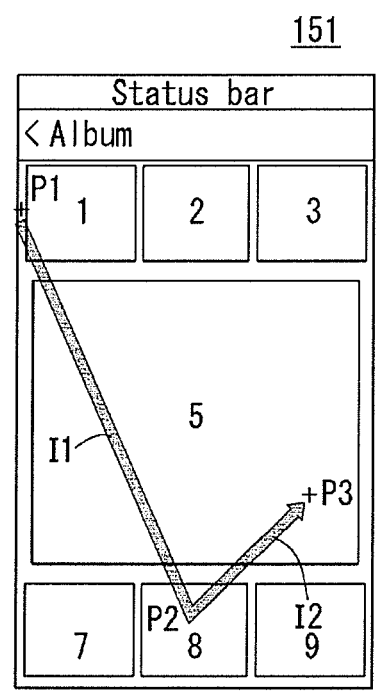

FIGS. 5 to 7 are views for explaining a control method related to an album application in a mobile terminal according to an example embodiment. Other embodiments and configurations may also be provided.

Referring to FIG. 5, the controller may display the first result screen by executing the first function of reducing image display scale upon reception of the first input I1 through the display unit 151 on which an album application execution screen is displayed.

The controller may process a function of reducing the display scale of images included in the album application execution screen as the first function when the first input I1 applied to the album application execution screen is received. The controller may gradually reduce the display scale according to length or angle of the first input, and thus dynamically change the first result screen and display the first result screen on the display unit 151.

The controller may display at least one image in an initially set content display scale on the display unit upon execution of the album application. That is, the controller may display images included in the album application execution screen in a 3×5 matrix. The controller may reduce the content display scale such that images are displayed in a 5×9 matrix (FIG. 5(b)) or a 7×12 matrix (FIG. 5(c)) upon reception of the first input I1 while the images are displayed in the 3×5 matrix. The controller may reduce the content display scale in stages according to a length range of the first input I1 or gradually decrease the content display scale in response to an increase in the length of the first input I1. For example, the controller can control the display scale to 0.8 when the length of the first input is in the range of 11 to 12 and to 0.6 when the length of the first input is in the range of 12 to 13. The controller may change a content arrangement method as the content display scale is controlled.

Referring to FIGS. 6 and 7, the controller may execute the second function related to the first result screen and display the second result screen upon reception of the second input I2 following the first input I1.

The controller may execute the second function related to the first result screen upon reception of the second input I2 that starts from the end point of the first input I1 and corresponds to a continuous touch input in the second diagonal direction. The controller may process, as the second function, a function of increasing the display scale of images included in the first result screen. The controller may control the display scale in stages or gradually according to length or angle of the second input, dynamically change the first result screen and display the first result screen on the display unit 151 as the display scale is controlled in stages or gradually.

The controller may receive the second input I2 following the first input I1, which is applied to the first result screen on which images are displayed in a 7×12 matrix. The first input I1 may be drag input in a right downward direction, and the second input I2 may be drag input in a right upward direction. The controller may increase the content display scale in stages according to a length range of the second input I2 or gradually increase the content display scale in response to an increase in the length of the first input I1. The controller may change the content arrangement method as the content display scale increases.

Referring to FIG. 6, the controller may display the second result screen (images in a 3×5 matrix) by executing the second function of increasing the display scales of images included in the first result screen (images in a 7×12 matrix).

Upon start of reception of the second input I2, the controller may display, at the center of the display unit (or at the substantially center area), the first content (image '5' in the 7×12 matrix) included in the first result screen, which corresponds to the end point P2 of the first input I1, and then increase the content display scale and display the second result screen. That is, the controller may display image '5' in a small size, which is displayed at point P2 of the first result screen, at the center of the display unit and then generate image '5' in a large size in a 3×5 matrix by executing the second function of gradually increasing the image display scale.

Additionally, upon reception of the second input I2, the controller may execute the second function of gradually increasing the display scale in a state that positions of images included in the first result screen are not changed. Upon completion of the second input I2, the controller may display, at the center of the display unit, the second content (image '5' in the 3×5 matrix) of the second result screen, which corresponds to the first content (image '5' in the 7×12 matrix) of the first result screen, which corresponds to the end point P2 of the first input I1. That is, the controller may execute the second function of gradually increasing the display scale while the small-sized image '5' is displayed at the point P2 of the first result screen so as to magnify the small-sized image '5' to large-sized image '5' in the 3×5 matrix, and display the large-sized image '5' in the 3×5 matrix at the center of the display unit upon completion of the second input. The controller may determine that the second input I2 is completed when the second input I2 is fixed to a specific point P3 for a predetermined time (or more) or the second input I2 is released.

Referring to FIG. 7, the controller may display the second result screen (images in the 3×5 matrix) by executing the second function of increasing display scale of images included in the first result screen (images in the 7×12 matrix).

The controller may display the second content corresponding to the end point P2 of the first input I1 in a larger size than other content.

According to an example embodiment, desired content of the user may be rapidly searched and searched specific content may be displayed at the center of the display unit by using touch in the form of "V" continuously applied to the displayed album application execution screen.

Figure 8:
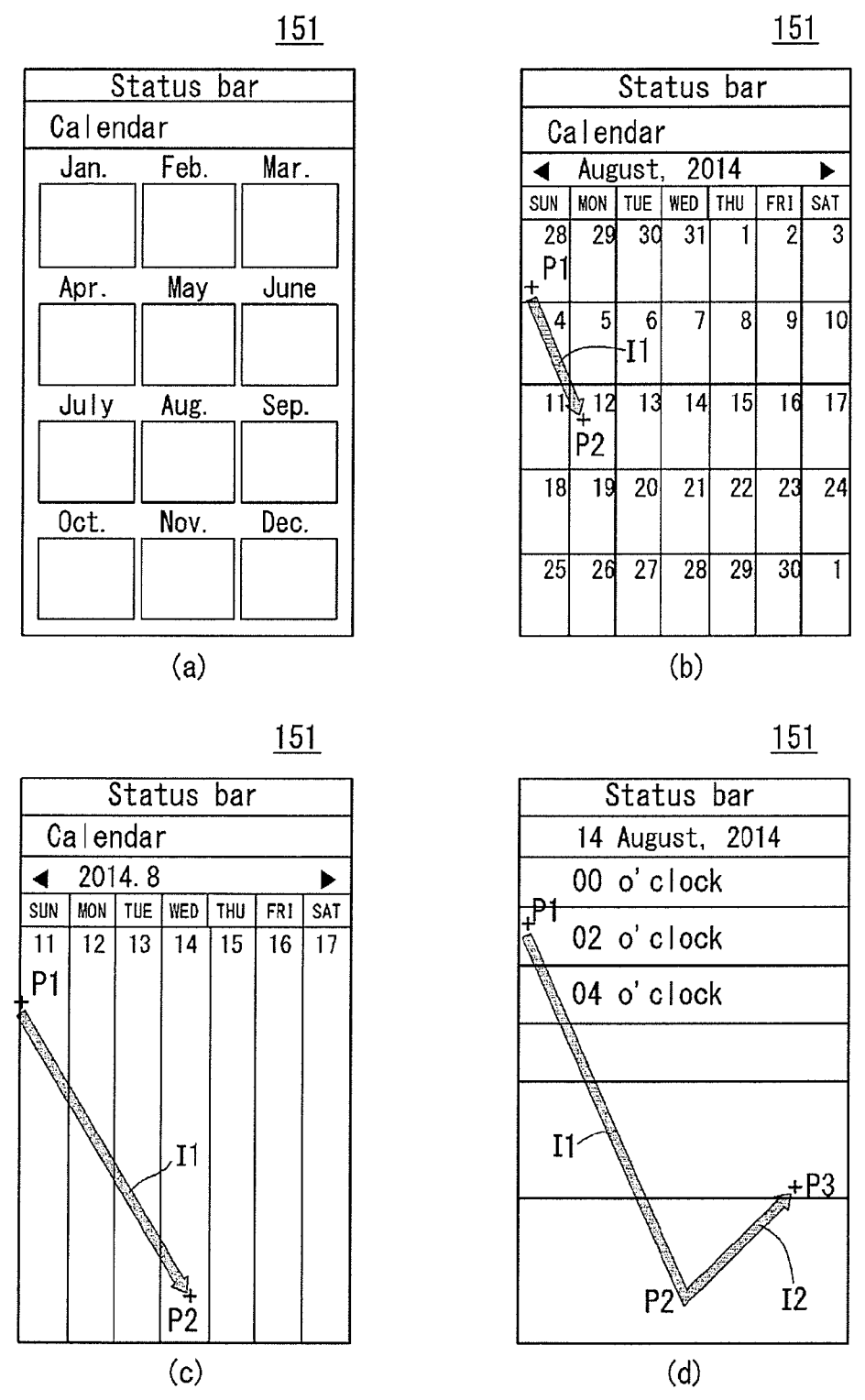

FIG. 8 is a view for explaining a control method related to a calendar application in a mobile terminal according to an example embodiment. Other embodiments and configurations may also be provided.

Referring to FIG. 8, the controller may display the first result screen by executing the first function of decreasing a calendar display unit upon reception of the first input I1 through the display unit 151 on which a calendar application execution screen is displayed.

The controller may process a function of reducing the calendar display unit displayed on the calendar application execution screen as the first function upon reception of the first input I1 applied to the calendar application execution screen. The controller may change the calendar display unit in stages according to length or angle of the first input.

The controller may display a calendar image in an initially set calendar display unit upon execution of the calendar application. For example, when the calendar display unit is initially set such that a yearly calendar is displayed, the controller can display the yearly calendar. The controller may change the calendar display unit in order of monthly calendar and weekly calendar upon reception of the first input I1.

Upon reception of the second input I2 that follows the first input I1, the controller may execute the second function of increasing the calendar display unit and display the second result screen. The controller may execute the second function of displaying a schedule corresponding to the date displayed at the end point P2 of the first input I1 upon reception of the second input I2.

For example, upon reception of the second input I2 that follows the first input I1 in a state that a calendar of a third week of August 2014 is displayed, the controller can execute the second function of displaying a schedule of 14th day of August, which is displayed at the end point P2 of the first input I1. The second function refers to a function of displaying a detailed schedule.

Figure 9:
Figure 9:
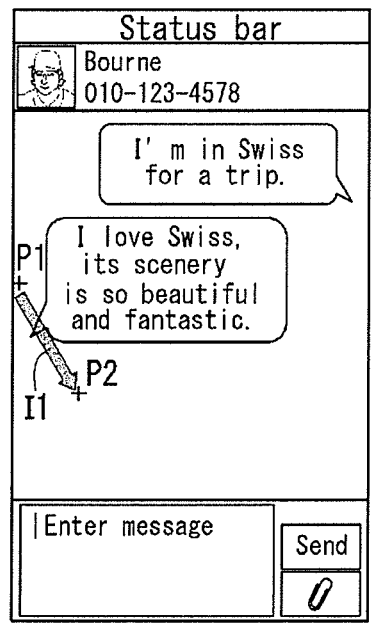
Figure 9:
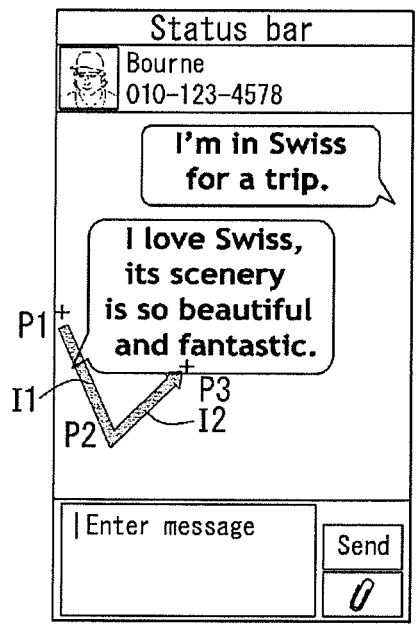
Figure 10:
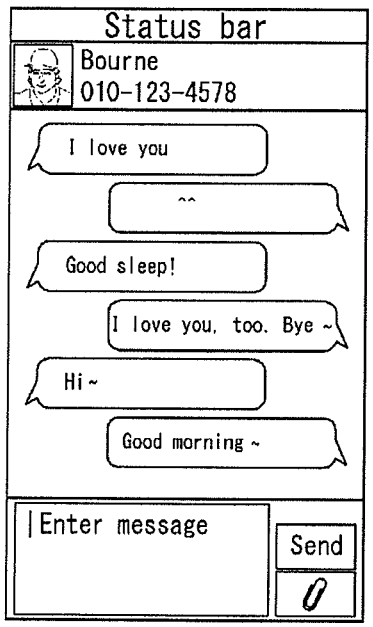
Figure 10:
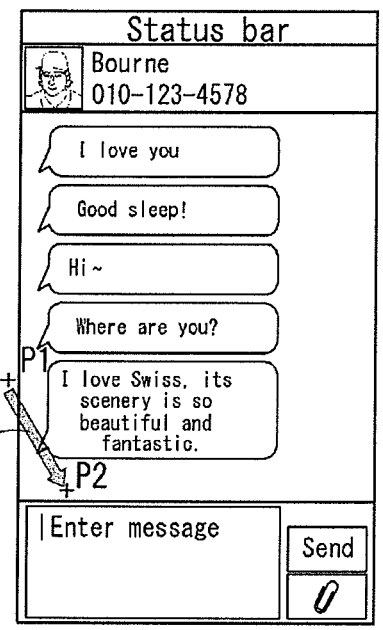
Figure 10:
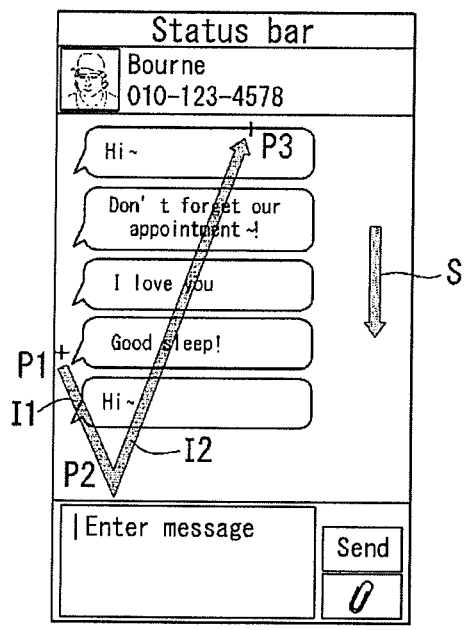
Figure 11:
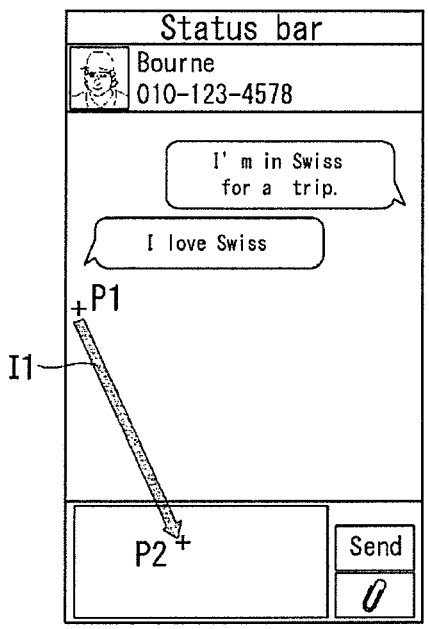
Figure 11:
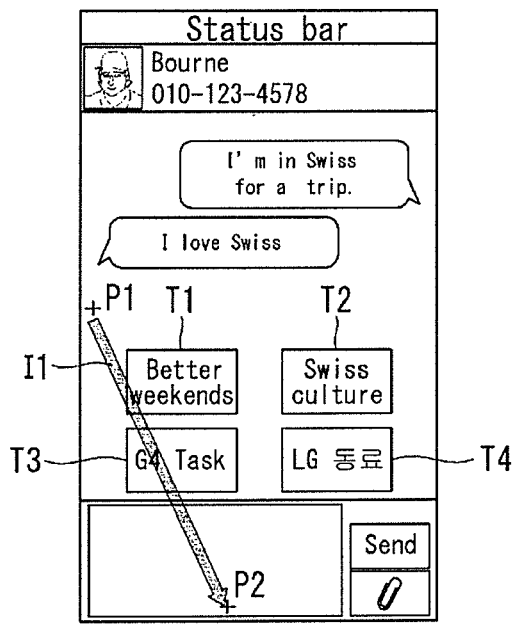
Figure 11:
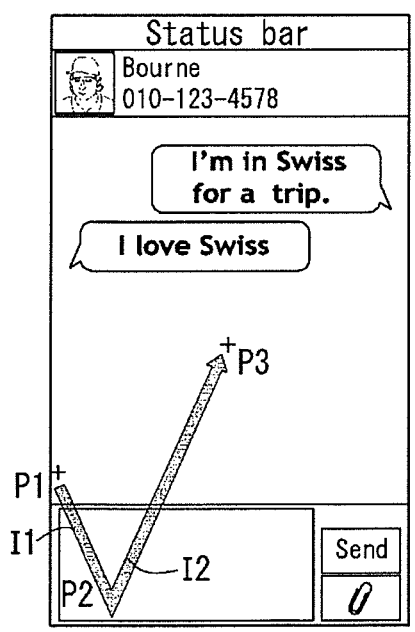

FIGS. 9 to 11 are views for explaining a control method related to a message application in a mobile terminal according to an example embodiment. Other embodiments and configurations may also be provided.

The controller may display the first result screen by executing the first function upon reception of the first input I1 through the display unit 151 on which the message application is displayed and display the second result screen by executing the second function upon reception of the second input I2 following the first input I1. The controller may set the first function as the second function in various manners.

Referring to FIG. 9, the controller may set, as the first function, a function of magnifying a size of letters of a message, and set, as a second function, a function of controlling thickness of letters of a message.

Upon reception of the first input I1 applied to the message application execution screen, the controller may gradually magnify or reduce letters of a message displayed on the message application execution screen. The controller may gradually magnify or reduce the letters of the message in the first diagonal direction of the first input I1 and control a magnification or reduction rate according to length of the first input I1.

For example, the controller can gradually magnify letters of the message when the first input I1 is applied in a right downward direction. The controller can gradually reduce letters of the message when the first input I1 is applied in a right upward direction.

The controller may gradually increase or decrease thickness of the letters of the message upon reception of the second input I2 following the first input I1. Additionally, the controller may control a thickness variation rate of the letters of the message according to the length of the second input I2.

For example, the controller can increase the thickness of the letters of the message upon reception of the second input I2 that starts from the end point P2 of the first input I1 applied in a right downward direction and is dragged in a right upward direction. On the contrary, the controller can decrease thickness of the letters of the message upon reception of the second input I2 that starts from the end point P2 of the first input I1 and is dragged in a left downward direction.

Referring to FIG. 10, the controller may set, as the first function, a function of displaying only transmitted messages or only received messages, and set, as the second function, a function of scrolling a message.

The controller may display only transmitted messages or only received messages upon reception of the first input I1 applied to the message application execution screen. The controller may display only transmitted messages or only received messages according to direction of the first input I1.

For example, the controller can display only received messages when the first input I1 is applied in a right downward direction. The controller can display only transmitted messages when the first input I1 is applied in a right upward direction. The controller may gradually reduce a message display scale according to length of the first input I1.

The controller may scroll the displayed message upon reception of the second input I2 following the first input I1. The controller may control a scroll speed according to length of the second input I2 and determine a scroll direction based on direction of the second input I2.

For example, the controller can scroll received messages downward upon reception of the second input I2 that starts from the end point P2 of the first input I1 applied in a right downward direction and is dragged in a right upward direction. On the contrary, the controller can scroll received messages upward upon reception of the second input I2 that starts from the end point P2 of the first input I1 and is dragged in a left downward direction. The controller may move content displayed at the lower part of the screen upward when the screen is scrolled downward and move content displayed at the upper part of the screen downward when the screen is scrolled upward.

Although the function of magnifying letters of a message is set as the first function and the function of controlling thickness of letters of a message is set as the second function in association with message application, the controller may change the first function to a function of displaying only transmitted messages or only received messages and change the second function to a function of scrolling a message when the first input I1 is applied to a message input region.

Referring to FIG. 11, the controller may set, as the first function, a tagging function and set, as the second function, the function of controlling the thickness of letters of a message.

The controller may tag a keyword or a representative image included in a message displayed on the message application execution screen upon reception of the first input I1 applied to the message application execution screen. The controller may recognize, as the first input I1, a drag input that starts from a first bezel region (of the display unit) and ends at a second bezel region (of the display unit).

For example, the controller can recognize a drag input that starts from a point P1 of the left bezel region (of the display unit) and ends at a point P2 of the lower bezel region. The controller may tag a keyword or a representative image included in the message displayed on the execution screen on the display unit and display the tag on the display unit.

The controller may gradually increase or decrease thickness of letters of the message upon reception of the second input I2 following the first input I1. Additionally, the controller may control a thickness variation rate of letters of the message according to length of the second input I2.

For example, the controller can increase the thickness of letters of the message upon reception of the second input I2 that starts from the end point P2 of the first input I1 applied in a right downward direction and is dragged in a right upward direction. On the contrary, the controller can decrease the thickness of letters of the message upon reception of the second input I2 that starts from the end point P2 of the first input I1 and is dragged in a left downward direction.

Figure 12:
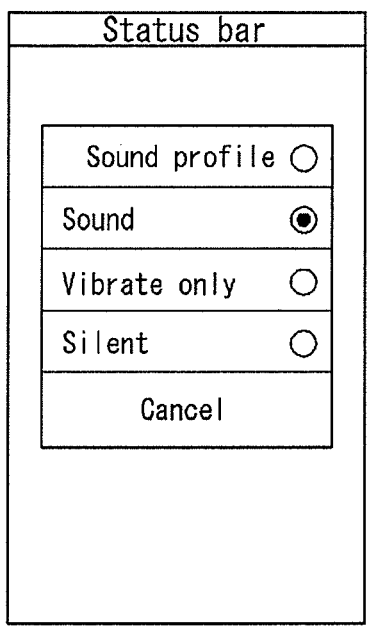
Figure 12:
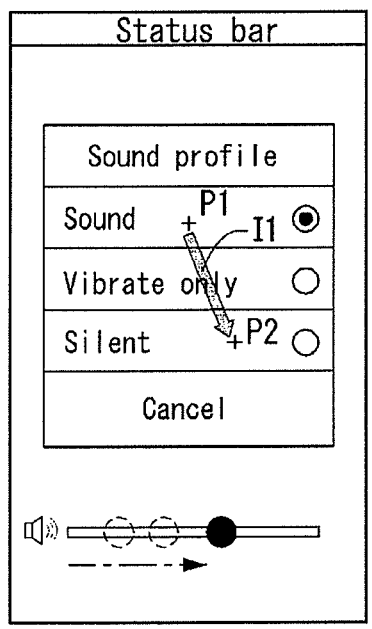
Figure 12:
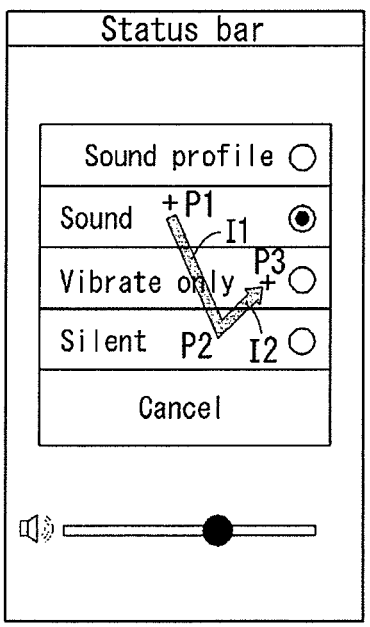

FIG. 12 is a view for explaining a control method related to a system setting application in a mobile terminal according to an example embodiment. Other embodiments and configurations may also be provided.

Referring to FIG. 12, the controller may execute the first function of increasing or decreasing a level of a selected setting item and display the first result screen upon reception of the first input I1 through the display unit 151 on which a system setting application execution screen is displayed.

More specifically, upon reception of the first input I1 when a sound setting item is selected, the controller may adjust a level of the selected sound setting item according to direction and length of the first input I1.

The controller may set the level of the selected setting item to the adjusted level upon reception of the second input I2 following the first input I1. More specifically, the controller may adjust the level of the sound setting item upon reception of the first input I1 and set the level of the sound setting item to the adjusted level upon reception of the second input I2.

Figure 13:
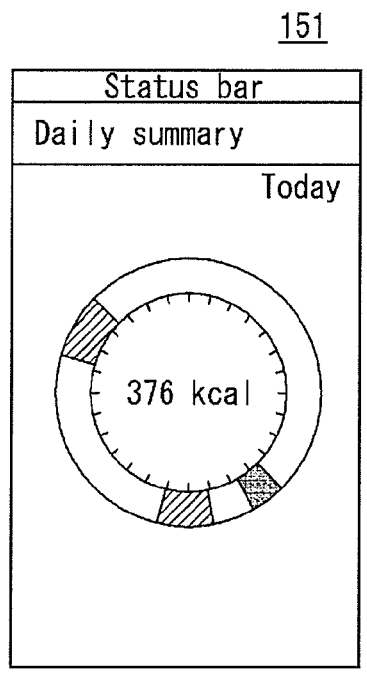
Figure 13:
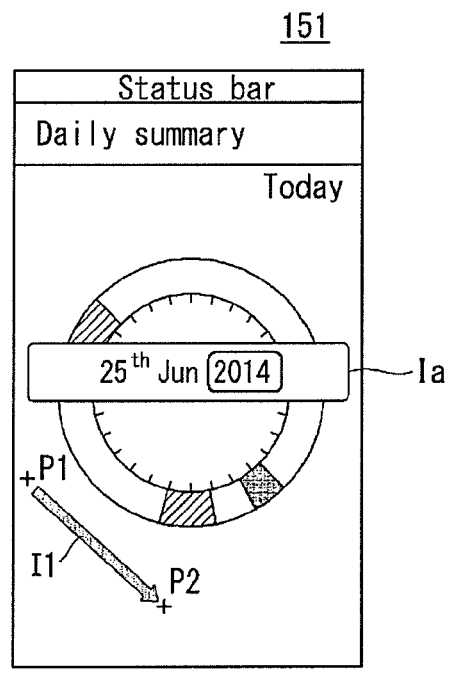
Figure 13:
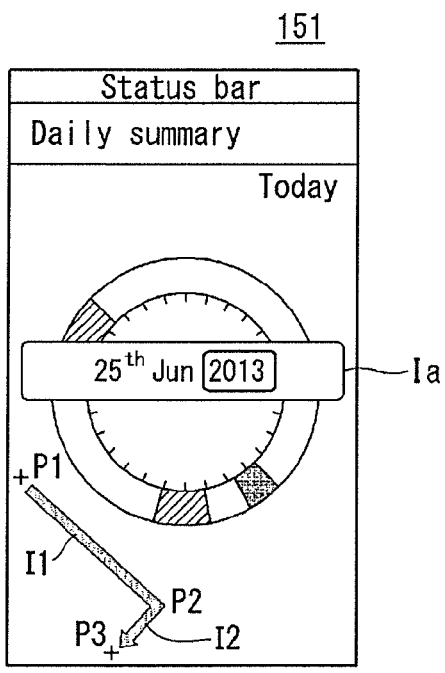
Figure 13:
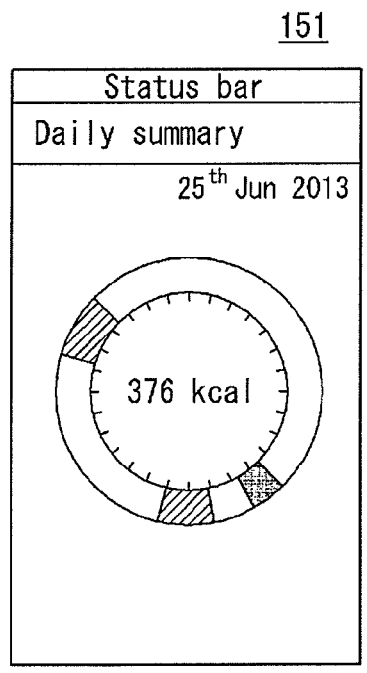

FIG. 13 is a view for explaining a control method related to an exercise information management application in a mobile terminal according to an example embodiment of the present invention. Other embodiments and configurations may also be provided.

Referring to FIG. 13, the controller may execute the first function of selecting a display unit of stored exercise information and display the first result screen upon reception of the first input I1 through the display unit 151 on which an exercise information management application execution screen is displayed.

Upon reception of the first input I1 while the exercise information management application execution screen is displayed, the controller may select the display unit of stored exercise information based on length or angle of the first input I1.

More specifically, the controller may select a display unit of stored exercise information from "date", "month" and "year" as length of the first input I1 increases or angle of the first input I1 to the edge of the display unit increases.

The controller may control the selected display unit more precisely upon reception of the second input I2 following the first input I1. More specifically, when "year" is selected as the display unit of stored exercise information upon reception of the first input I1, the controller may adjust "year" to 2014, 2013, 2012 or the like upon reception of the second input I2.

The controller may display exercise information corresponding to the adjusted time (25 Jun. 2013) upon completion of the second input I2.

Figure 14:
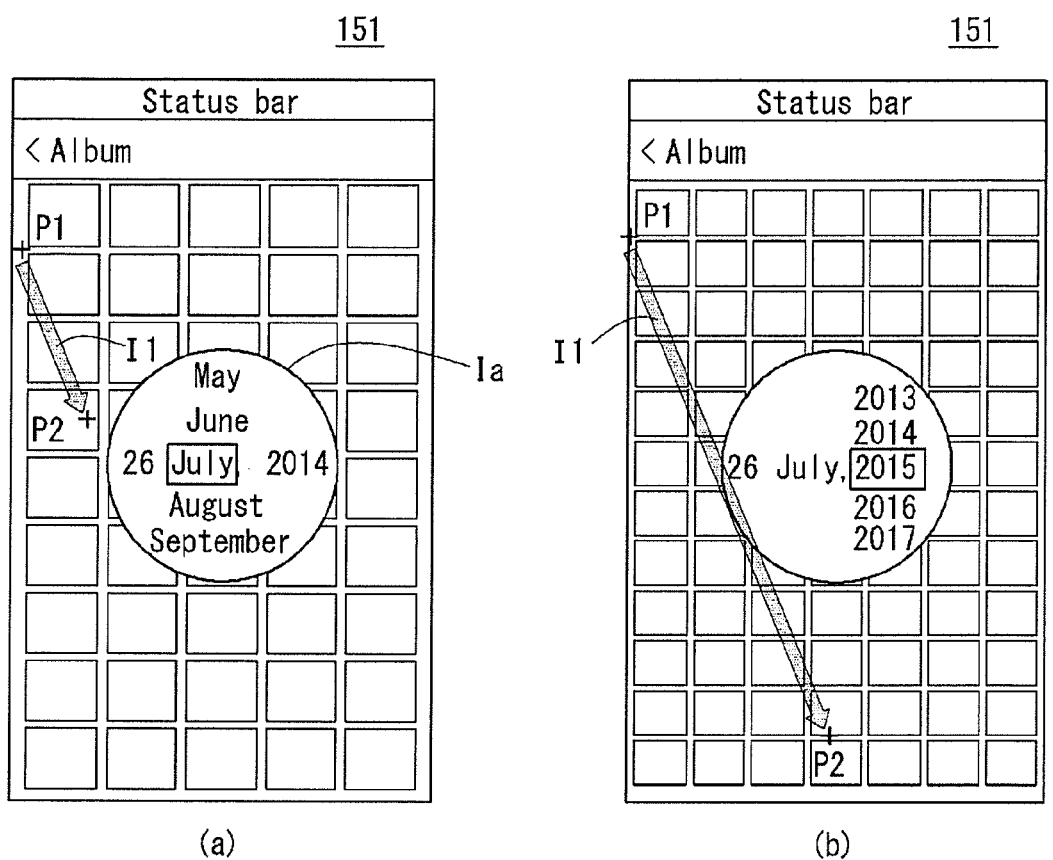
Figure 15:
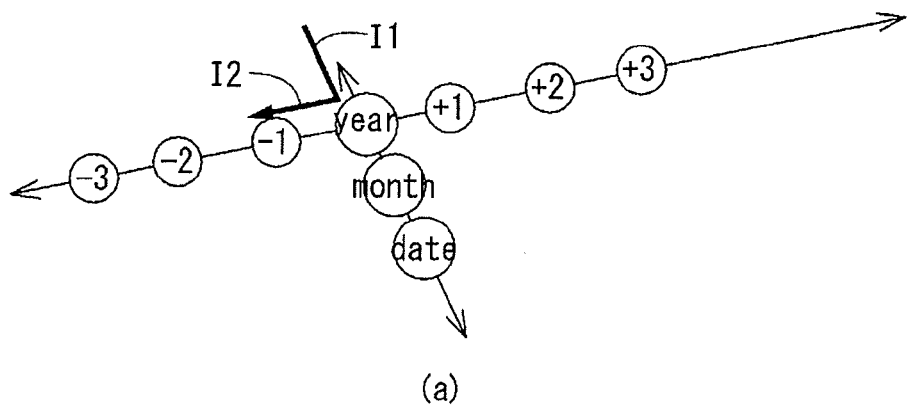
Figure 15:
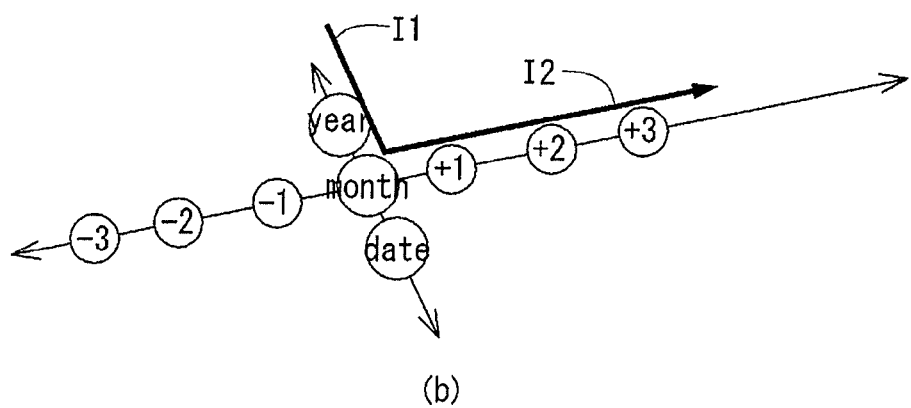
Figure 15:
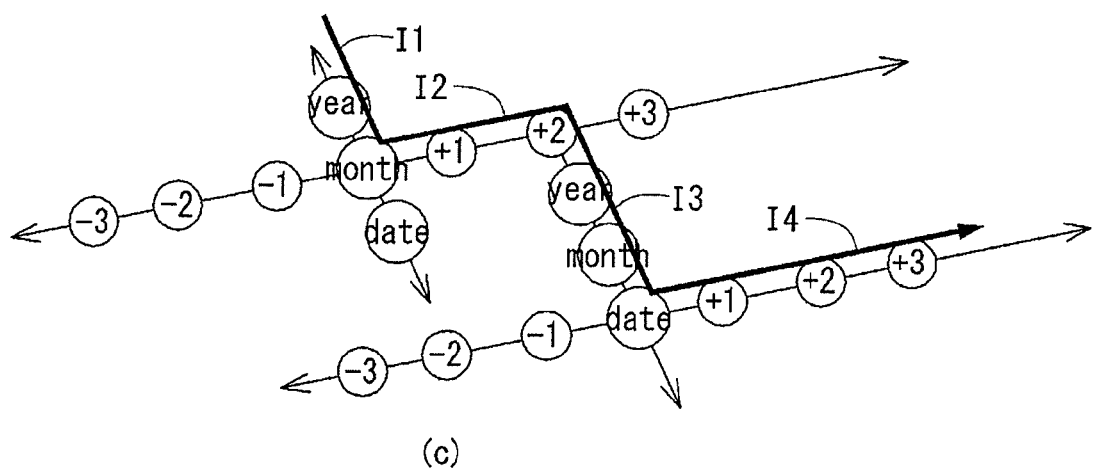
Figure 16:
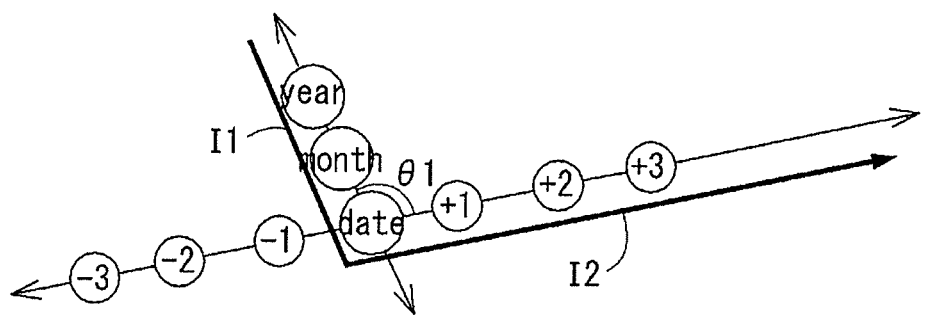
Figure 16:
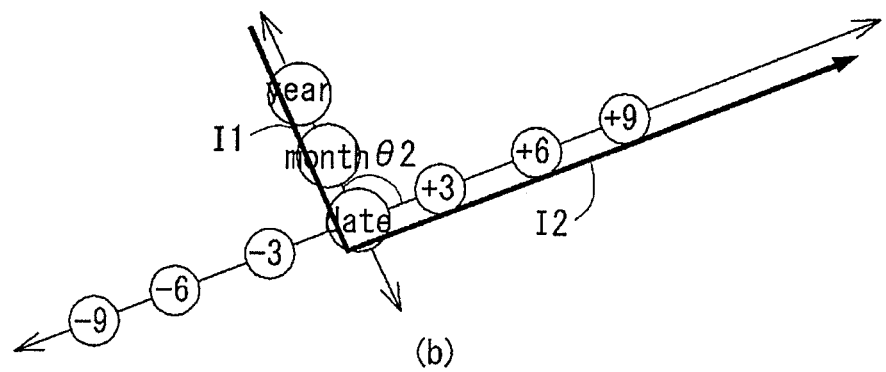
Figure 16:
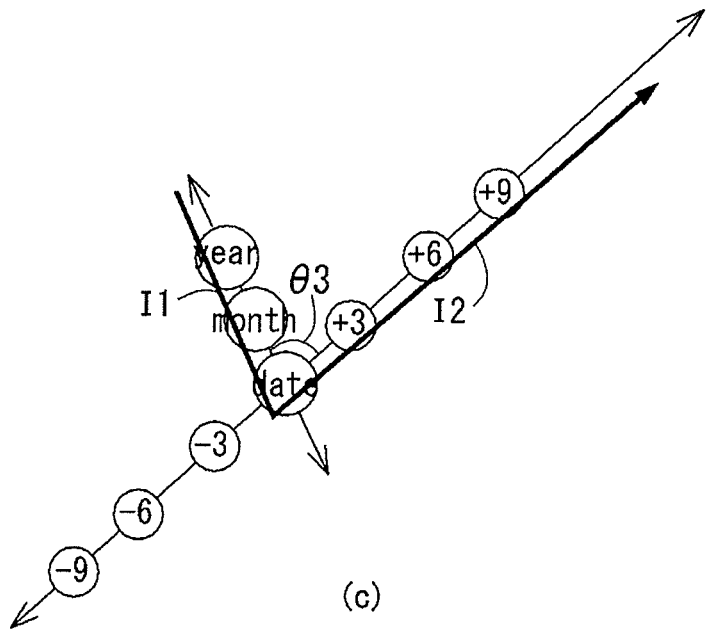

FIGS. 14 to 16 are views for explaining a method of displaying an indicator for guiding a control method in a method for controlling a mobile terminal according to an example embodiment. Other embodiments and configurations may also be provided.

Referring to FIG. 14, the controller may display, at the center of the display unit 151, an indicator Ia for guiding a function corresponding to the first or second input.

When the first function or the second function is controlled in stages or gradually according to at least one of length, angle and speed of the first input or the second input, the controller may display information with respect to the first input or the second input by means of the indicator Ia.

When the first function of controlling content display scale is executed upon reception of the first input I1, the controller may display "year", "month" and "date", which are content display scale control units, using the indicator Ia. More specifically, the controller may display information about a content display scale control unit change according to a change of length or angle of the first input I1 using the indicator Ia.

For example, the controller can execute the first function of changing the content display scale in order of "date", "month" and "year" upon reception of the first input I1 and display the indicator Ia to enable a selection box through which a content display scale change unit is selected to be moved.

Referring to FIG. 15, when the first function or the second function is changed according to lengths and directions of the first to fourth inputs 11 to 14, the controller may display figures for guiding the function change as indicators.

Referring to FIG. 16, when the first function or the second function is changed according to length, angle and direction of the first input I1 or the second input I2, the controller may display figures for guiding the function change as indicators.

Figure 17:
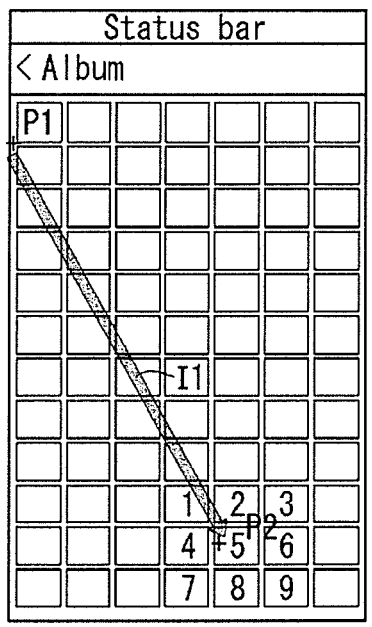
Figure 17:
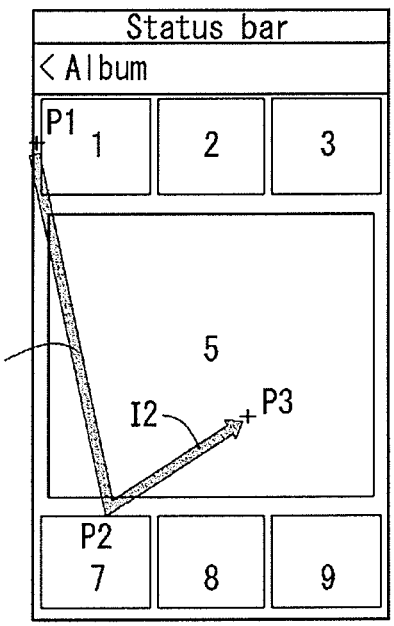
Figure 17:
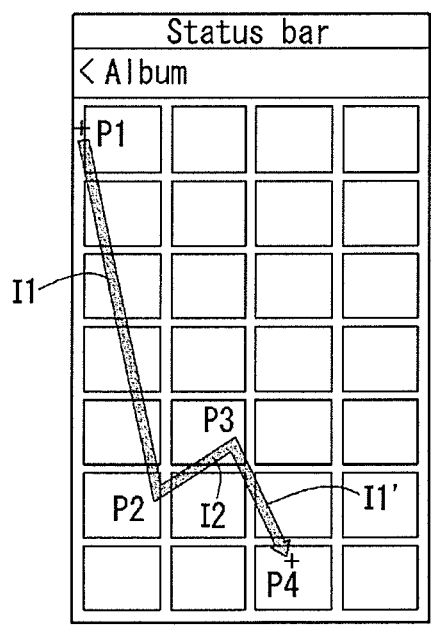

FIG. 17 is a view for explaining a control method when the first input or the second input is repeatedly received in a method for controlling the mobile terminal according to an example embodiment. Other embodiments and configurations may also be provided.

Referring to FIG. 17, the controller may repeatedly execute the first function or the second function upon reception of the third input corresponding to the first input that follows the second input, or reception of the fourth input corresponding to the second input that follows the third input.

The controller may repeatedly execute the first function or the second function upon continuous reception of the third input or the fourth input corresponding to a direction of the first input or the second input (i.e., a right downward direction, a left downward direction, a right upward direction or a left upward direction). As previously described, the first function or the second function may be controlled based on length, angle and speed of the third input or the fourth input.

More specifically, the controller may display images with the image display scale gradually reduced upon reception of the first input I1 and display images with the image display scale gradually increased upon reception of the second input I2. The controller may magnify an image corresponding to the end point P2 of the first input I1 and display the image at the center of the display unit. Upon reception of the third input I1' following the second input I2, the controller may display (on the display unit) a third result screen that displays images in the display scale reduced from the display scale of the second result screen.

Figure 18:
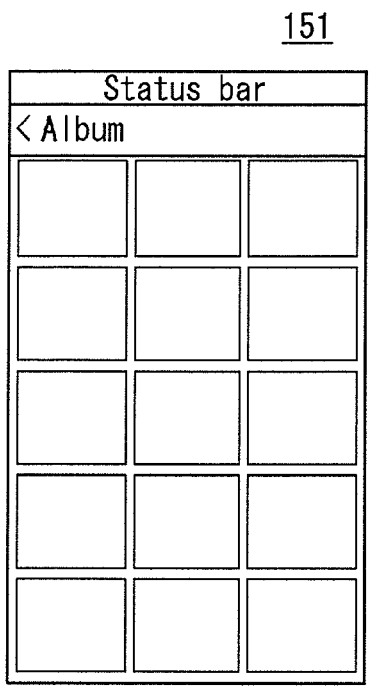
Figure 18:
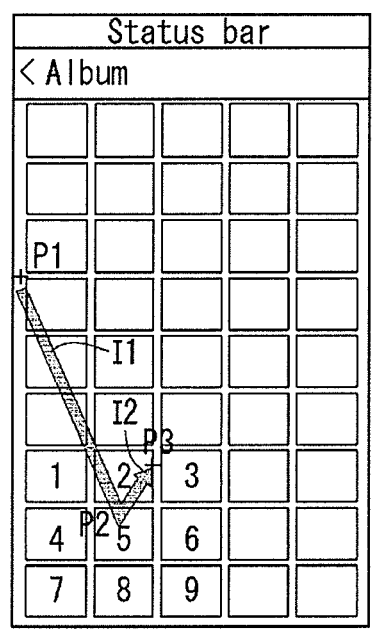
Figure 18:
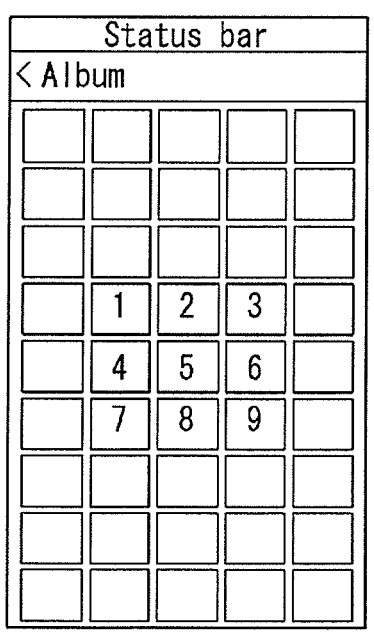

FIG. 18 is a view for explaining a control method based on length of the second input in a method for controlling a mobile terminal according to an example embodiment. Other embodiments and configurations may also be provided.

Referring to FIG. 18, the controller may move the first content to the center of the display unit and display the first content thereon upon reception of the second input in having length less than a predetermined length.

The controller may move only the display position of the first result screen without executing the function of increasing the display scale of the first result screen upon reception of the second input having a length less than the predetermined length.

More specifically, the controller may move an image (image '5' in a 5×9 matrix) displayed at the end point of the first input I1 to the center of the display unit and display the image thereon upon reception of the second input I2 having a length less than the predetermined length.

Figure 19:
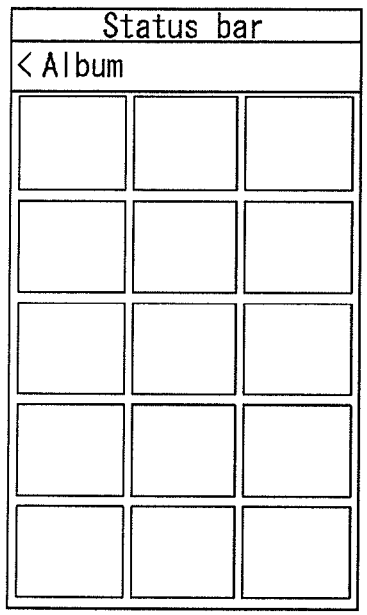
Figure 19:
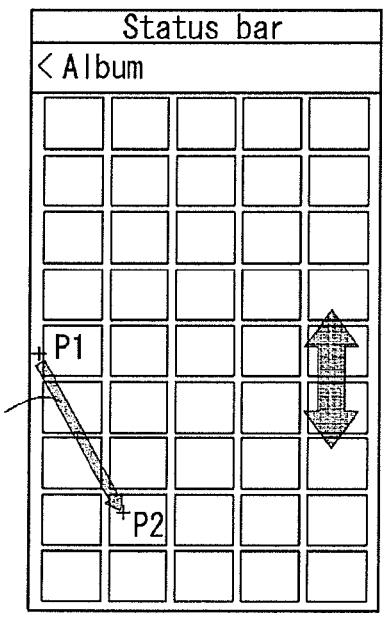
Figure 19:
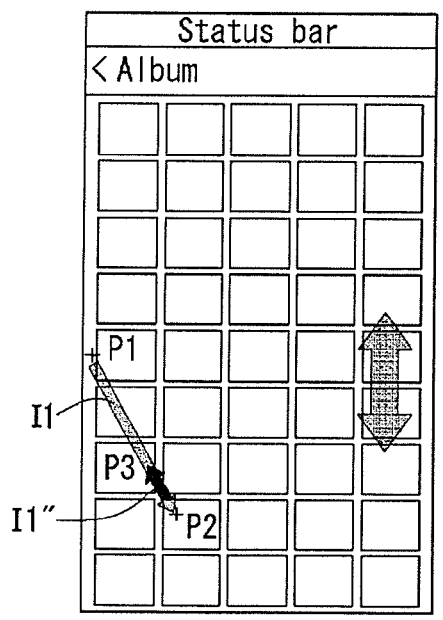
Figure 19:
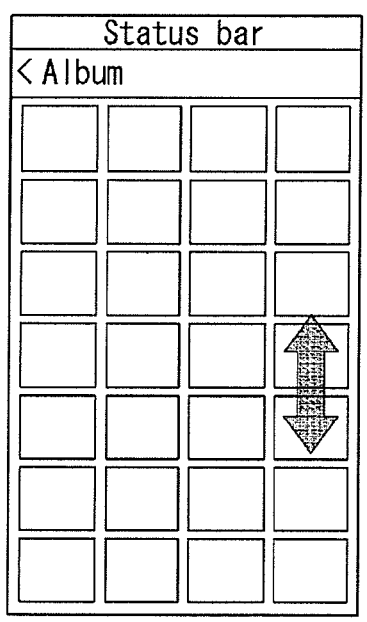

FIG. 19 is a view for explaining a control method with respect to a reverse input of the first input or the second input in a method for controlling a mobile terminal according to an example embodiment. Other embodiments and configurations may also be provided.

Referring to FIG. 19, upon reception of a reverse input of the first input or the second input, the controller may restore, in response to reverse input, a previous state prior to execution of the first function or the second function.

The controller may adjust the image display scale from a 3×5 matrix (FIG. 19(*a*)) to a 5×9 matrix (FIG. 19(*b*)) by executing the second function of reducing the image display scale upon reception of the first input I1 that reaches the point P2. Upon reception of reverse input I1" of the first input I1 that follows the first input I1 and starts from the end point P2 of the first input I1, the controller may increase the reduced image display scale in response to the reverse input I1".

Accordingly, the controller can increase the image display scale so as to display images in a 4×7 matrix (FIG. 19(*d*)) upon reception of the reverse input I1".

Figure 20:
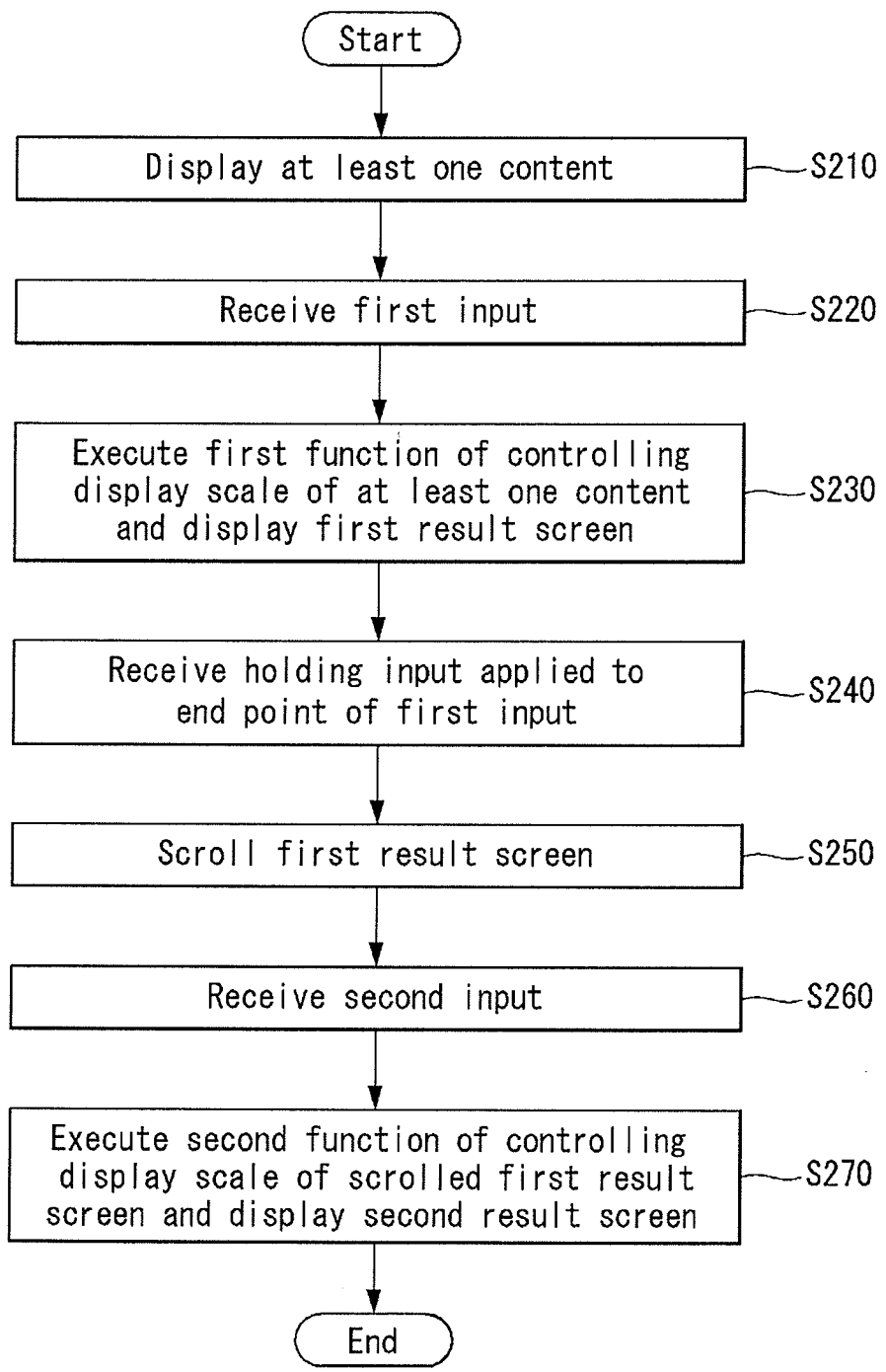
FIG. 20 is a flowchart illustrating a method for controlling a mobile terminal in accordance with an example embodiment.

FIG. 20 is a flowchart illustrating a method for controlling a mobile terminal according to an example embodiment. Other embodiments and configurations may also be provided.

Referring to FIG. 20, the controller 180 may display, in operation S210, at least one piece of content on the display unit 151, and receive, in operation S220, the first input through the display unit 151.

The controller may execute a specific application and display an execution screen of the specific application on the display unit. The specific application execution screen may include at least one piece of content. For example, the controller can display, on the display unit, at least one image by executing the gallery application.

The controller may receive the first input applied to the display unit on which the content is displayed. The first input may be a continuous touch input in the first diagonal direction and may start from the bezel (of the display unit). The first input may be a touch input applied to a point on the bezel (of the display) unit and a continuous touch input applied to the touchscreen in the first diagonal direction, which are simultaneously received. More specifically, when a drag input is received that starts from the bezel (of the display unit) and has an angle in a specific range to the horizontal or vertical direction of the touchscreen, the controller may recognize the drag input as the first input.

In operation S230, the controller 180 may execute the first function of controlling display scale of the at least one piece of content, and may display the first result screen on the display unit 151 upon reception of the first input.

The controller may preset the first function corresponding to the first input to a function of reducing the display scale. The first function may be a function of dynamically decreasing the display scale of the at least one piece of content upon reception of the first input. The controller may decrease the display scale gradually or in stages using at least one of length, direction and speed of the first input.

When the first function is controlled gradually or in stages according to the first input, the controller may dynamically change and display the first result screen acquired from execution of the first function. For example, the controller can decrease size of the at least one piece of content gradually or in stages and display the content on the display unit upon reception of the first input and reset a method of arranging the content as size of the content decreases.

The controller 180 may receive, in operation S240, a holding input that follows the first input and is applied to the end point of the first input, and scroll, in operation S250, the first result screen upon reception of the holding input.

The controller may handle an input that is applied to the end point of the first input for a predetermined time (or more) without release of the first input, as the holding input. The controller may scroll the first result screen in a predetermined direction upon reception of the holding input. The controller may preset a scroll direction corresponding to the holding input.

The controller may scroll the first result screen at a predetermined specific speed or scroll the first result screen while dynamically controlling the scroll speed according to a tilting degree of the mobile terminal or display scale of content included in the first result screen.

The controller 180 may receive, in operation S260, the second input following the holding input, and display the second result screen on the display unit 151 by executing, in operation S270, the second function of controlling display scale of the scrolled first result screen upon reception of the second input.

The controller may receive the second input following the holding input with the holding input not released. The controller may recognize, as the second input, a continuous touch input that starts from the point to which the holding input is applied and is dragged in the second diagonal direction different from the first diagonal direction. More specifically, the second input may be drag input that starts from the end point of the holding input and is moved in a direction different from that of the first input. Further, the second input may correspond to a touch input applied to a point in the bezel (of the display unit) and a continuous touch input applied to the touchscreen in the second diagonal direction, which are simultaneously received.

The controller may execute the second function related to the first result screen and display, on the display unit, the second result screen upon reception of the second input.

The controller may display the second result screen by executing the second function of controlling the display scale of the first result screen that has been scrolled, upon reception of the second input. The controller may preset the second function corresponding to the second input to a function of increasing display scale. The second function may be a function of increasing the display scale gradually or in stages according to length, direction and speed of the second input. The controller may continuously scroll the first result screen in response to the holding input even if the second input is received after completion of the holding input and execute the second function corresponding to the second input upon completion of scroll of the first result screen.

The controller may display, on the display unit, the second result screen acquired when the display scale of the first result screen, which has been scrolled, is increased. The controller may increase the display scale of the first result screen gradually or in stages upon reception of the second input, and thus the controller may dynamically change and display the second result screen.

Upon reception of the second input, the controller may display, at the center of the display unit, the second content of the second result screen, which relates to the first content of the scrolled first result screen. The first content may correspond to the end point of the holding input. The controller may scroll the first result screen upon reception of the holding input and determine content of the first result screen, which corresponds to the end point of the holding input, as the first content upon completion of the holding input and reception of the second input. The controller may determine, as the first content, content that is displayed on the first result screen and corresponds to the end point of the holding input at a holding input end time.

FIGS. 21 to 27 are views for explaining a method for controlling a mobile terminal according to an example embodiment.

Figure 21:
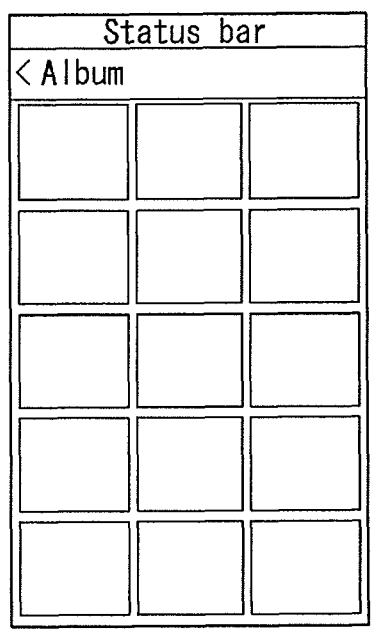
FIGS. 21 to 27 are views for explaining a method for controlling the mobile terminal in accordance with an example embodiment.
Figure 21:
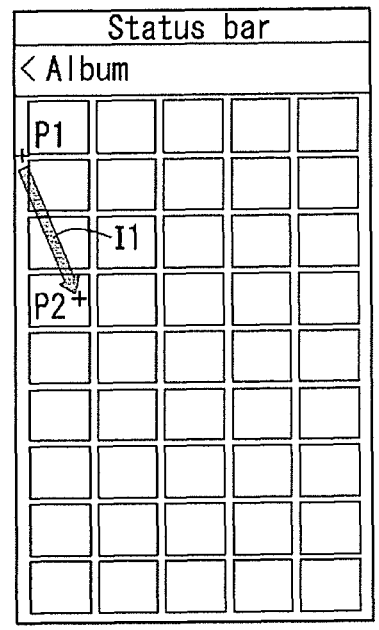
Figure 21:
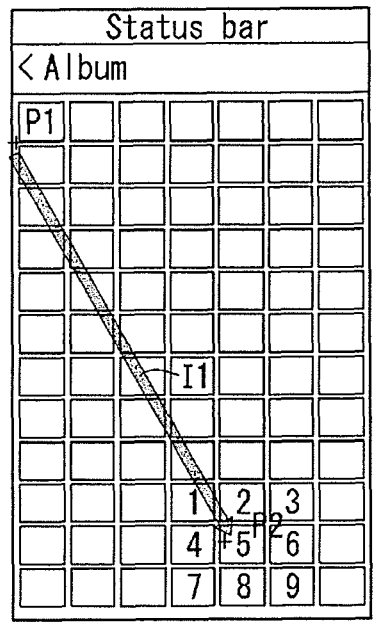
Figure 21:
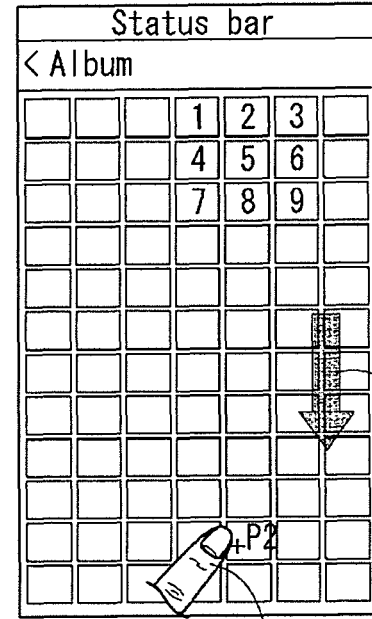
Figure 22:
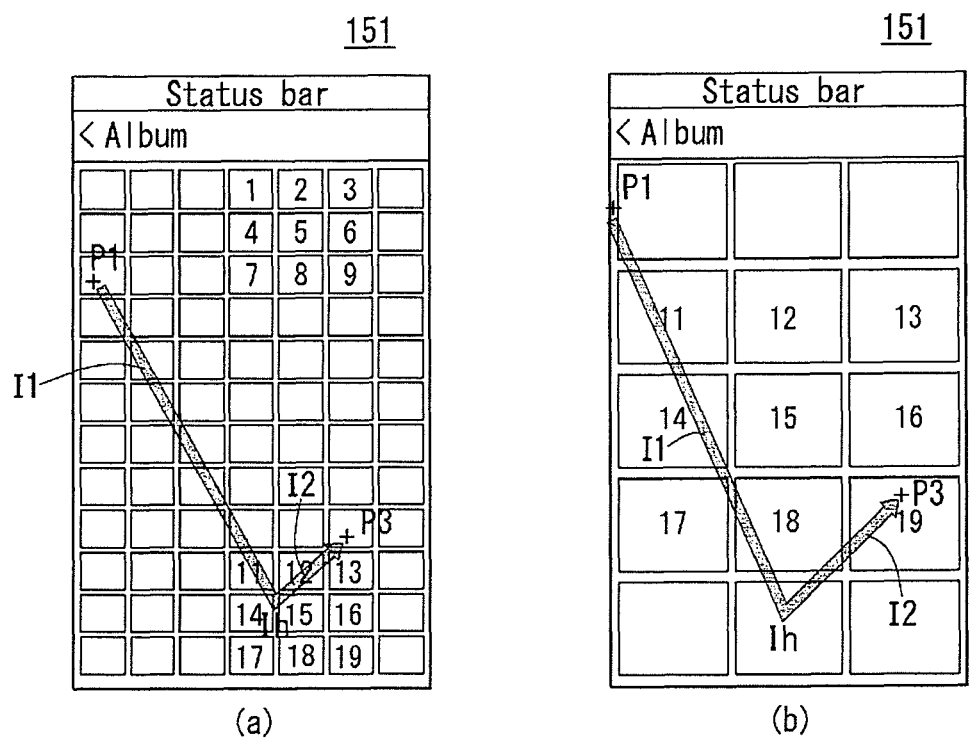
Figure 23:
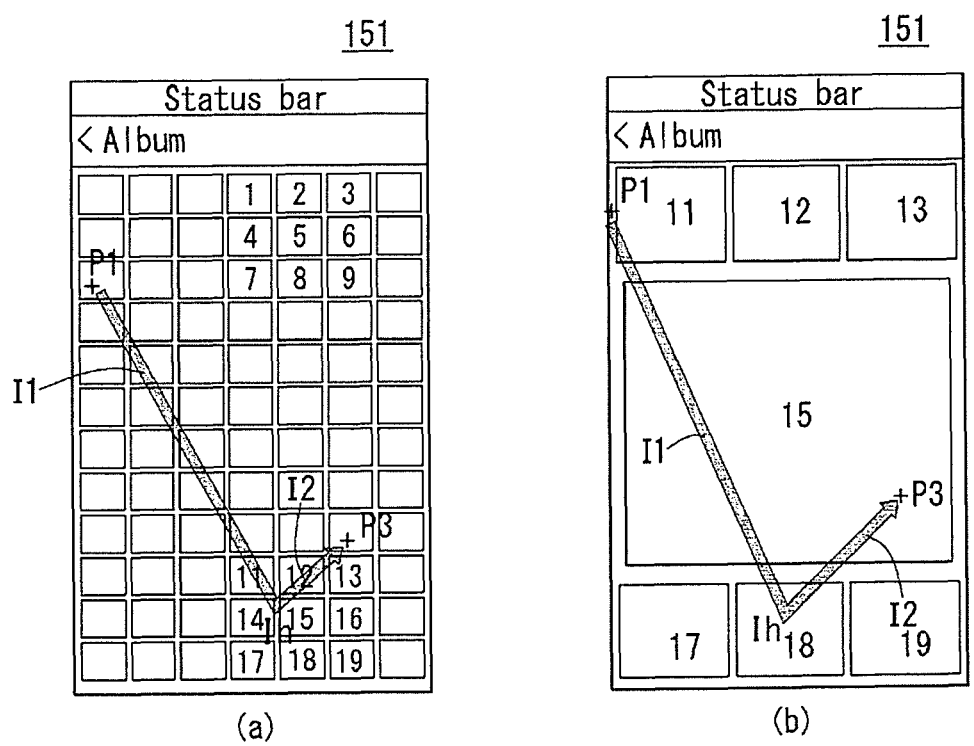

FIGS. 21 to 23 are views for explaining a method of controlling an album application in a mobile terminal according to an example embodiment. Other embodiments and configurations may also be provided.

Referring to FIG. 21, the controller may execute the first function of decreasing the image display scale so as to display the first result screen upon reception of the first input I1 through the display unit 151 on which the album application execution screen is displayed.

The controller may process a function of reducing the display scale of images included in the album application execution screen as the first function when the first input I1 applied to the album application execution screen is received. The controller may gradually reduce the display scale according to length or angle of the first input, and thus dynamically change the first result screen and display the first result screen on the display unit 151.

More specifically, the controller may display, on the display unit, at least one image in an initially set content display scale upon execution of the album application. That is, the controller may display images included in the album application execution screen in a 3×5 matrix. The controller may reduce the content display scale such that images are displayed in a 5×9 matrix or a 7×12 matrix upon reception of the first input I1 while the images are displayed in the 3×5 matrix. The controller may reduce the content display scale in stages according to length range of the first input I1 or gradually decrease the content display scale in response to an increase in length of the first input I1.

The controller may scroll the first result screen upon reception of holding input I1 that follows the first input I1 and is applied to the end point P2 of the first input I1. More specifically, the controller may scroll the first result screen downward (S) upon reception of the holding input applied to the end point P2 of the first input I1. The controller may move image '5' in a 7×12 matrix that is displayed at the point P2, upward and display the image.

Referring to FIGS. 22 and 23, the controller may execute the second function related to the first result screen and display the second result screen upon reception of the second input I2 following the holding input Ih.

The controller may execute the second function related to the scrolled first result screen upon reception of the second input I2 that starts from the end point of the holding input Ih and corresponds to a continuous touch input in the second diagonal direction. The controller may process a function of increasing the display scale of images included in the scrolled first result screen as the second function. The controller may control the display scale in stages or gradually according to length or angle of the second input, dynamically change the first result screen and display, on the display unit, the first result screen as the display scale is controlled in stages or gradually.

More specifically, the controller may receive the second input I2 following the holding input Ih that is applied to the scrolled first result screen on which images are displayed in a 7×12 matrix. The second input I2 may be drag input in a right upward direction, which is distinguished from the first input I1. The controller may increase the content display scale in stages according to a length range of the second input I2 or gradually increase the content display scale in response to an increase in the length of the first input I1. The controller may change the content arrangement method as the content display scale increases.

Referring to FIG. 22, the controller may display the second result screen (images in a 3×5 matrix) by executing the second function of increasing display scales of images included in the scrolled first result screen (images in a 7×12 matrix).

Upon beginning of reception of the second input I2, the controller may display, at the center of the display unit, the first content (image '15' in the 7×12 matrix) which corresponds to the end point P2 of the holding input Ih and is included in the first result screen and then increase content display scale and display the second result screen. That is, the controller may display, at the center of the display unit, small-sized image '15' displayed at the point P2 of the scrolled first result screen and then generate large-sized image '15' in a 3×5 matrix by executing the second function of gradually increasing the image display scale.

Upon beginning of reception of the second input I2, the controller may cancel the scroll operation corresponding to the holding input Ih, display the first content (image '15' in the 7×12 matrix) of the scrolled first result screen at the center of the display unit, increase content display scale and display the second result screen.

Additionally, the controller may execute the second function of gradually increasing the display scale in a state that positions of images included in the first result screen are not changed, upon reception of the second input I2. Upon reception of the second input I2 when scroll operation corresponding to the holding input Ih is not completed, the controller may simultaneously perform the scroll operation and the operation of increasing the display scale.

Upon completion of the second input I2, the controller may display, at the center of the display unit, the second content (image '15' in the 3×5 matrix) of the second result screen, which corresponds to the first content (image '15' in the 7×12 matrix) of the scrolled first result screen, which corresponds to the end point P2 of the holding input I1. That is, the controller may execute the second function of gradually increasing the display scale while the small-sized image '15' is displayed at the point P2 of the scrolled first result screen so as to magnify the small-sized image '15' to large-sized image '15' in the 3×5 matrix, and display the large-sized image '15' in the 3×5 matrix at the center of the display unit upon completion of the second input. The controller may determine that the second input I2 is completed when the second input I2 is fixed to the specific point P3 for a predetermined time (or more) or the second input I2 is released.

Referring to FIG. 23, the controller may display the second result screen (images in the 3×5 matrix) by executing the second function of increasing the display scale of images included in the scrolled first result screen (images in the 7×12 matrix). The controller may display the second content corresponding to the end point P2 of the holding input Ih in a larger size than other content. That is, the image '15' in the 3×5 matrix can be displayed larger than other images.

Figure 24:
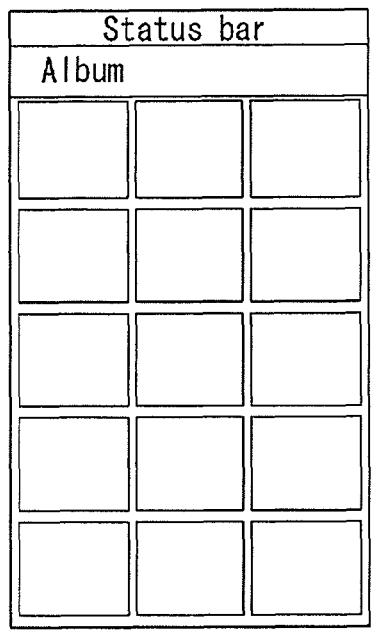
Figure 24:
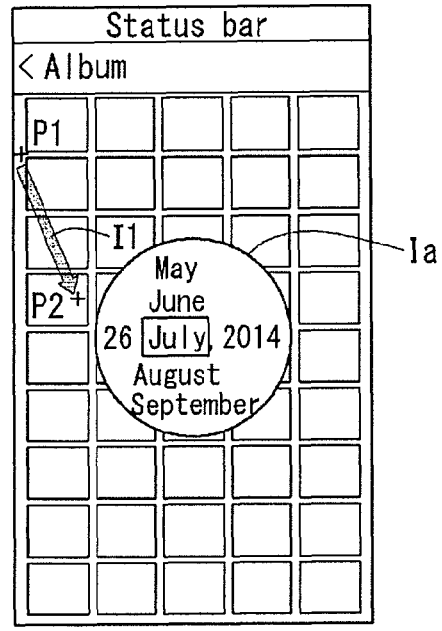
Figure 24:
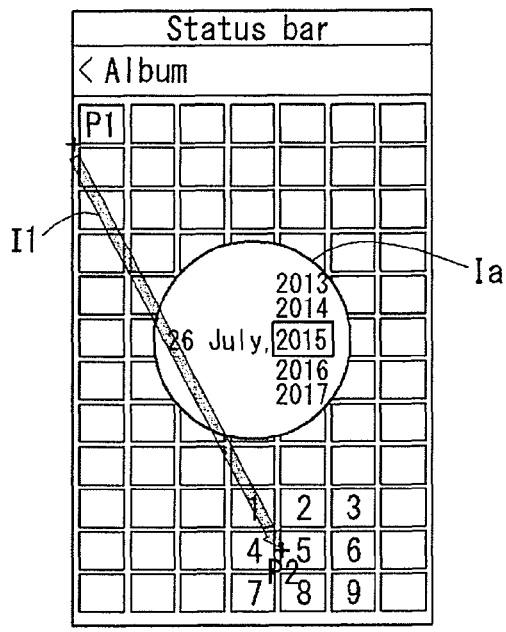
Figure 24:
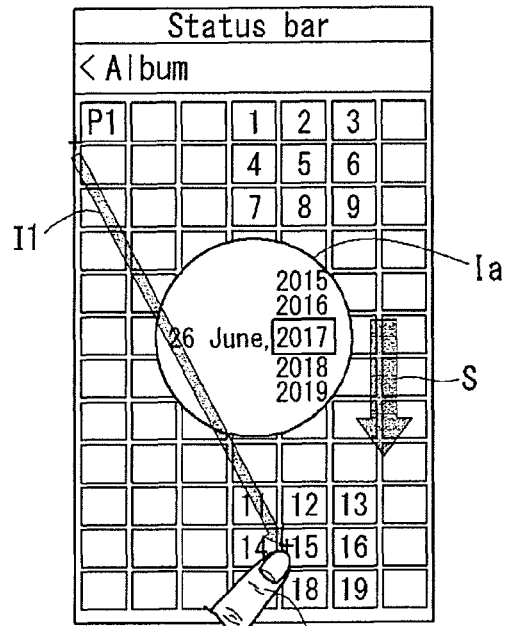
Figure 25:
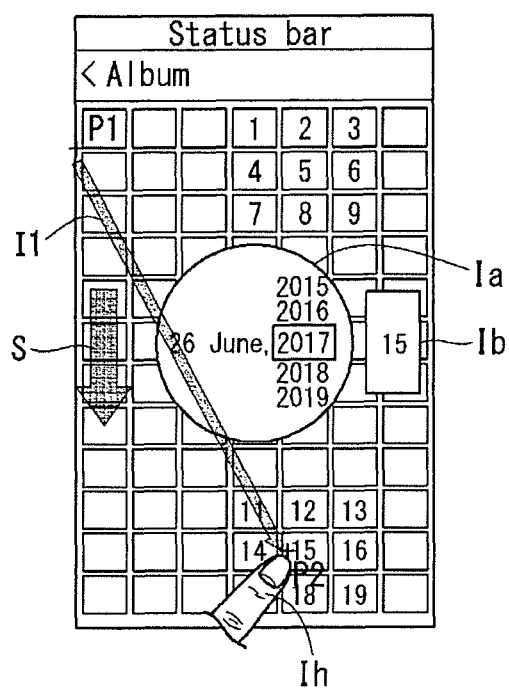

FIGS. 24 and 25 are views for explaining a method of displaying an indicator for guiding a control method in a method for controlling a mobile terminal according to example embodiment. Other embodiments and configurations may also be provided.

Referring to FIG. 24, the controller may display, at the center of the display unit 151, the indicator Ia for guiding a function corresponding to the first input, holding input or second input.

More specifically, when the first function or the second function is controlled in stages or gradually according to at least one of length, angle and speed of the first input or the second input, the controller may display information with respect to the first input or the second input by means of the indicator Ia and display information on content scrolled according to the holding input using the indicator Ia.

When the first function of controlling the content display scale is executed upon reception of the first input I1, the controller may display "year", "month" and "date", which are content display scale control units, using the indicator Ia. More specifically, the controller may display information about a content display scale control unit change according to a change of length or angle of the first input I1 using the indicator Ia.

For example, the controller can execute the first function of changing the content display scale in order of "date", "month" and "year" upon reception of the first input I1 and display the indicator Ia to enable a selection box through which a content display scale change unit is selected to be moved.

When the controller scrolls the first result screen upon reception of the holding input, the controller may increase or decrease the display scale change unit of selected content. More specifically, the controller may change "year", which is the selected display scale change unit, from "15 (2015)" to "17 (2017)" and display the display scale change unit by means of the indicator Ia during reception of the holding input.

Referring to FIG. 25, the controller may display, at the center of the display unit, a magnified thumbnail Ib of content displayed at the point P2 to which the holding input is applied as the first result screen is scrolled. The thumbnail Ib may be a representative image, brief information such as an image photographing date, a keyword and/or the like.

Figure 26:
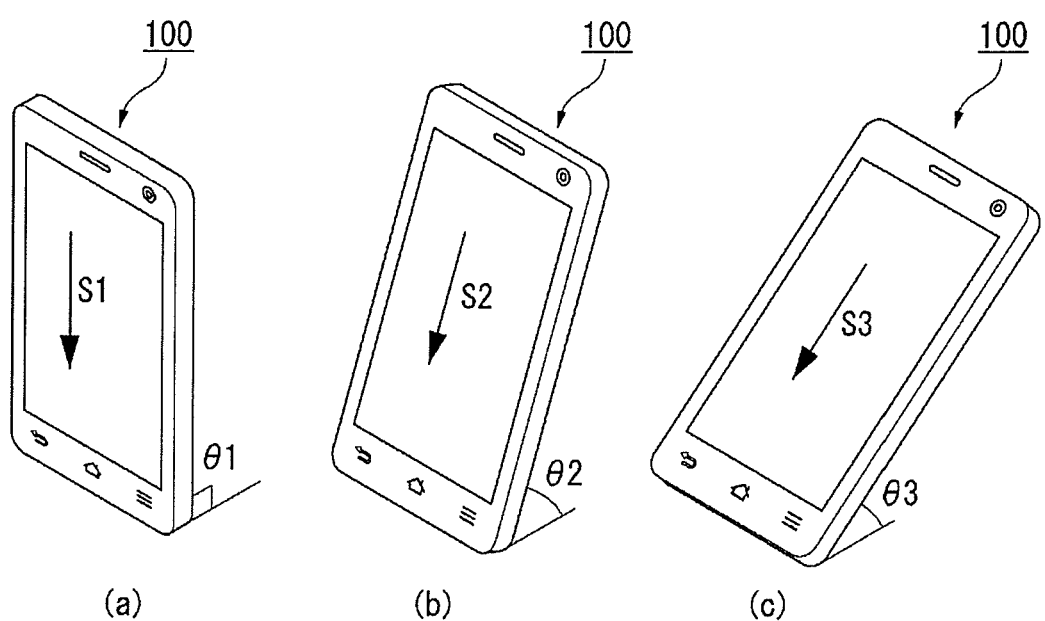
Figure 27:
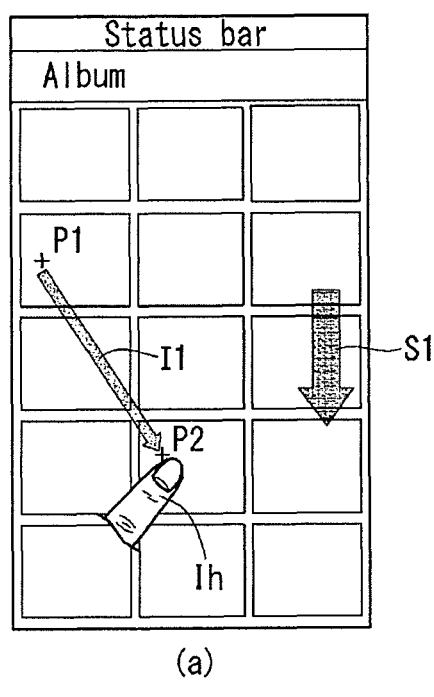
Figure 27:
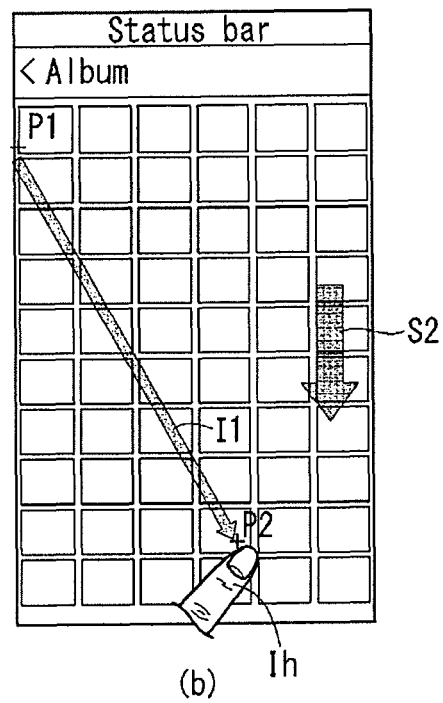

FIGS. 26 and 27 are views for explaining a method of controlling a scroll speed according to an example embodiment. Other embodiments and configurations may also be provided.

Referring to FIG. 26, the controller may determine a scroll speed by sensing an angle between the mobile terminal and ground upon reception of the holding input.

More specifically, the controller may control the first result screen scroll speed to gradually decrease as the angle between the mobile terminal and ground decreases to θ1, θ2 and θ3 upon reception of the holding input.

Referring to FIG. 27, the controller may determine the scroll speed based on the display scale of content included in the first result screen upon reception of the holding input.

More specifically, upon reception of the holding input, the controller may control the scroll speed to be maintained as a first speed when the display scale of content included in the first result screen exceeds a predetermined reference value, and control the scroll speed to be changed to a second speed when the display scale is less than the predetermined reference value. That is, the controller may automatically decrease the scroll speed so as to increase a content identification rate when content included in the first result screen is displayed in a very low scale.

Figure 28:
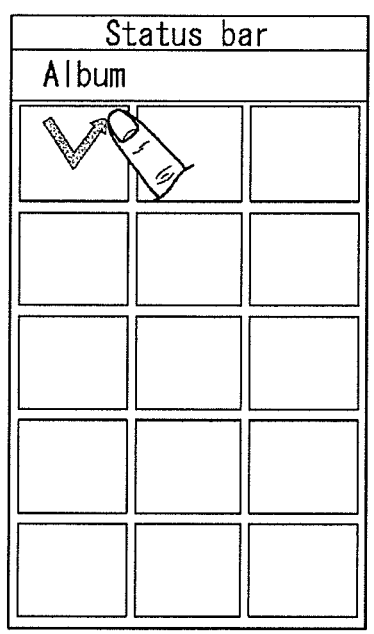
FIGS. 28 to 30 are views for explaining a method for controlling a mobile terminal in accordance with an example embodiment.
Figure 28:
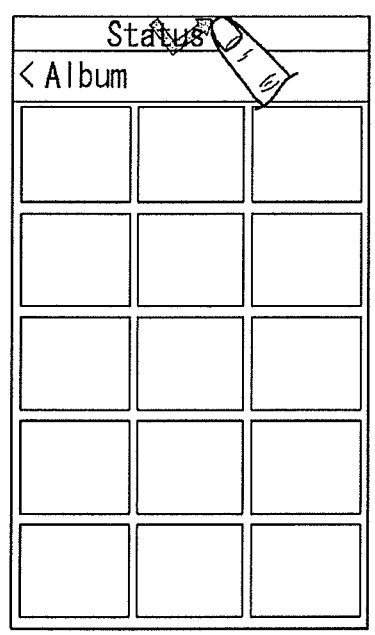
Figure 29:
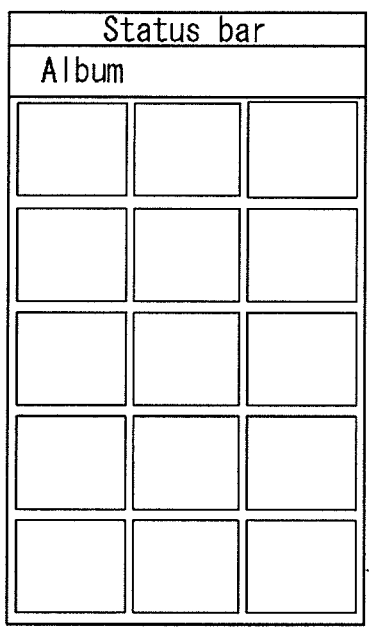
Figure 29:
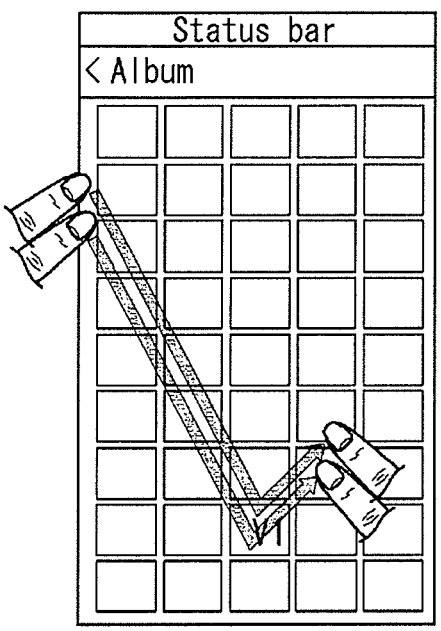
Figure 29:
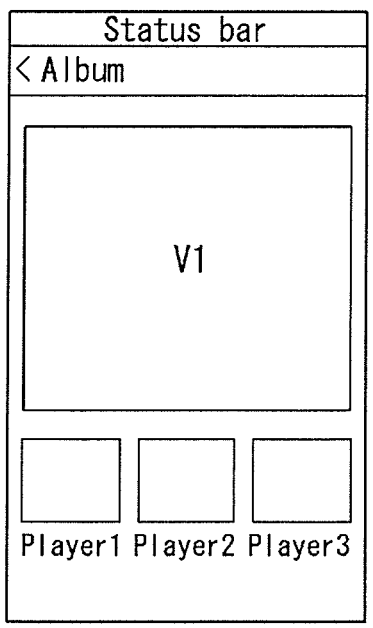
Figure 30:
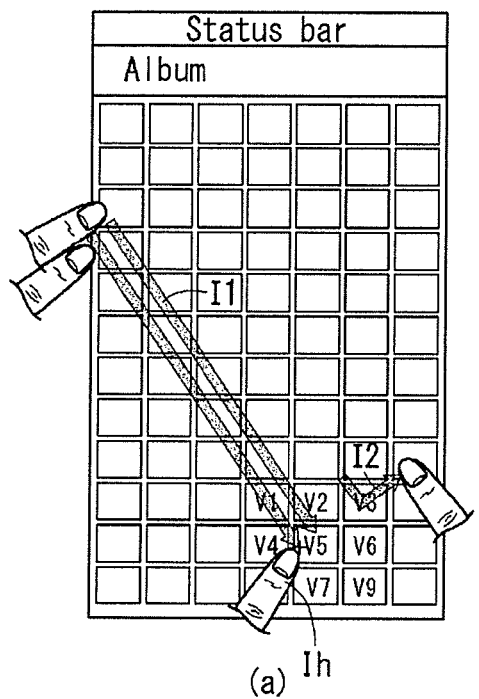
Figure 30:
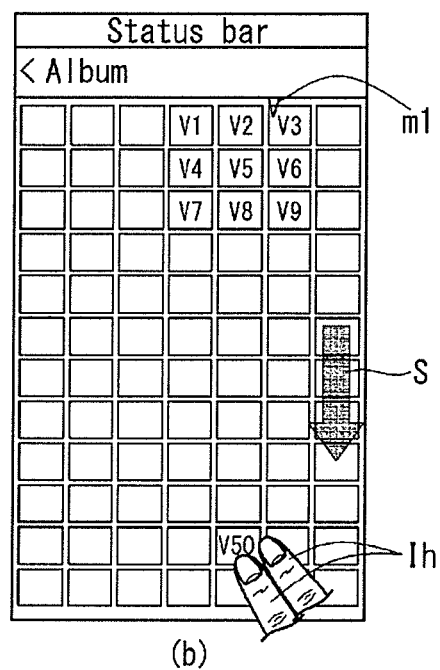
Figure 30:
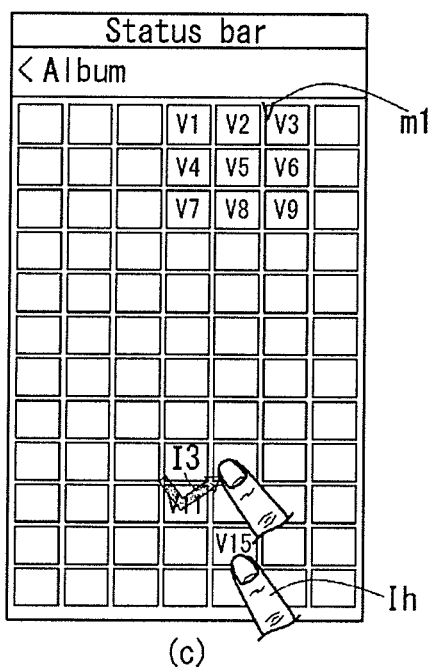
Figure 30:
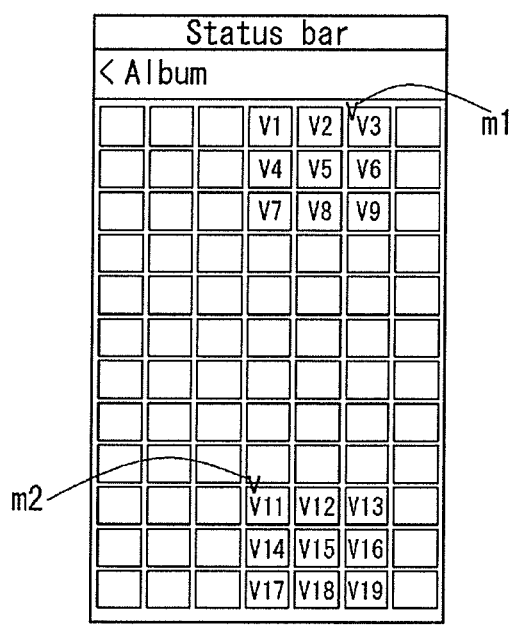

FIGS. 28 to 30 are views for explaining methods for controlling a mobile terminal according to example embodiments. Other embodiments and configurations may also be provided.

Referring to FIG. 28, the controller may display at least one piece of content on the display unit. Upon reception of a gesture input in the form of "V", which is applied to specific content or a specific region of the corresponding execution screen, the controller may generate a bookmark.

More specifically, upon reception of the gesture input in the form of "V", which is applied to first specific content from among content displayed on the display unit, the controller may generate a bookmark with respect to the first specific content. Upon reception of gesture input in the form of "V", which is applied to second specific content with the bookmark generated for the first specific content, the controller may additionally generate a bookmark with respect to the second specific content.

Additionally, upon reception of the gesture input in the form of "V", which is applied to a status bar on the screen on which an execution screen of a specific application is displayed, the controller may generate a bookmark for the corresponding execution screen.

The controller may add a menu item for executing a function of collectively viewing specific content or execution screens with bookmarks.

Referring to FIGS. 29 and 30, the controller may display content on the display unit. Upon reception of gesture input in the form of "V", which is applied using two fingers, through the display unit, the controller may execute a function discriminated from a function corresponding to the gesture input in the form of "V" using one finger. A description may be provided of a function executed when the gesture input in the form of "V" using two fingers is received during execution of the album application.

Referring to FIG. 29, the controller may decrease the image display scale upon reception of the first input I1, applied in a right downward direction using two fingers, through the display unit on which at least one image is displayed.

Upon reception of the second input I2 applied in a right upward direction using two fingers, the controller may magnify specific content V1 corresponding to the end point of the first input I1, display the magnified content at the center of the display unit and display players Player 1, Player 2 and Player 3 that can play the specific content V1.

Referring to FIG. 30, the controller may decrease the image display scale upon reception of the first input I1, applied in a right downward direction using two fingers, through the display unit on which at least one image is displayed.

Upon reception of the V gesture input applied to a first specific image V3 displayed in the reduced display scale using one of two fingers with the other finger fixed to the end point of the first input I1, the controller may generate a bookmark m1 with respect to the first specific image V3 displayed in the reduced display scale.

Upon reception of the holding input Ih applied to the end point of the first input I1 using two fingers after generation of the bookmark, the controller may scroll down images in the reduced display scale. The controller may indicate a scroll direction S using an indicator.

Upon reception of the V gesture input applied to a second specific image V11 displayed in the reduced display scale using one of two fingers with the other finger fixed to the end point of the holding input Ih, the controller may generate a bookmark m2 with respect to the second specific image V11 displayed in reduced display scale.

Functions corresponding to a plurality of inputs using fingers can be set when two or more functions can be controlled through one continuous gesture according to application characteristics.

An embodiment may provide a mobile terminal and a method for controlling the same, that causes the display unit to display at least one content on the display unit, execute a first function related to the content displayed on the display unit in response to a first input through the display unit, and cause the display unit to display a first result screen on the display unit, the first result screen corresponding to the first function. This may be performed by a controller. The controller may further execute a second function related to the first result screen in response to a second input, wherein the second input is successively received following the first input, and cause the display unit to display a second result screen, the second result screen corresponding to the second function. The controller may be configured to cause the display unit to display second content of the second result screen in a center of the display unit, the second content being related to first content of the first result screen, and the first content displayed in the end point of the first input.

An embodiment may provide a mobile terminal and a method for controlling the same that causes the display unit to display at least one content on the display unit, execute a first function of controlling a display scale of the content displayed on the display unit in response to a first input through the display unit, and cause the display unit to display a first result screen, the first result screen corresponding to the first function. The controller may scroll the first result screen in response to a holding input applied to the end point of the first input, executes a second function of controlling a display scale of the scrolled first result screen in response to a second input, wherein the second input is successively received following the holding input, and cause the display unit to display a second result screen on the display unit, the second result screen corresponding to the second function, wherein the first function and the second function control the display scales in opposite manners.

According to an embodiment, a mobile terminal may include a display unit; and a controller configured to cause the display unit to display at least one content on the display unit, execute a first function related to the content displayed on the display unit in response to a first input through the display unit, cause the display unit to display a first result screen on the display unit, the first result screen corresponding to the first function, execute a second function related to the first result screen in response to a second input, wherein the second input is successively received following the first input, and cause the display unit to display a second result screen, the second result screen corresponding to the second function. The controller may be configured to cause the display unit to display second content of the second result screen in a center of the display unit, the second content is related to first content of the first result screen, and the first content is displayed in the end point of the first input.

According to an embodiment, a mobile terminal may include a display unit; and a controller configured to cause the display unit to display at least one content on the display unit, execute a first function of controlling a display scale of the content displayed on the display unit in response to a first input through the display unit, cause the display unit to display a first result screen, the first result screen corresponding to the first function, scroll the first result screen in response to a holding input applied to the end point of the first input, execute a second function of controlling display scale of the scrolled first result screen in response to a second input, wherein the second input is successively received following the holding input, and cause the display unit to display a second result screen on the display unit, the second result screen corresponding to the second function. The first function and the second function control the display scales in opposite manners.

According to an embodiment, a method may be provided for controlling a mobile terminal. The method may include displaying at least one content; receiving a first input through a display unit; executing a first function related to the content in response to the first input; and displaying a first result screen, the first result screen corresponding to the first function. The method may also include executing a second function related to the first result screen in response to the second input; displaying a second result screen, the second result screen corresponding to the second function, wherein the displaying of the second result screen includes displaying second content of the second result screen in a center of a screen, the second content is related to first content of the first result screen, and the first content is displayed in the end point of the first input.

According to an embodiment, a method may be provided for controlling a mobile terminal. The method may include displaying at least one content; receiving a first input through a display unit; executing a first function of controlling a display scale of the content in response to the first input; displaying a first result screen, the first result screen corresponding to the first function; receiving a holding input applied to the end point of the first input; and scrolling the first result in response to the holding input. The method may also include receiving a second input, wherein the second input is successively received following the holding input; executing a second function of controlling a display scale of the scrolled first result screen in response to the second input; and displaying a second result screen, the second result screen corresponding to the second function. The first function and the second function control the display scales in opposite manners.

The mobile terminal and method for controlling the same, according to embodiments may have advantages.

According to at least one embodiment, two or more functions may be executed with one input that is continuously applied so as to rapidly perform functions that a user desires.

According to at least one embodiment, specific content that the user desires may be displayed at a center of a display through one input that is continuously applied.

According to at least one embodiment, representative information about scrolled content in a specific area may be displayed so as to accurately search for information that the user desires by controlling input.

Various embodiments may be implemented using a machine-readable medium having instructions stored thereon for execution by a processor to perform various methods presented herein. Examples of possible machine-readable mediums include HDD (Hard Disk Drive), SSD (Solid State Drive), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a display; and
    a controller configured to:
       control the display unit to display at least one content;
       in response to receiving a first input at the display, execute a first function related to the content displayed on the display;
       control the display to display a first result screen, the first result screen corresponding to the first function;
       in response to receiving a second input that is successively received following the first input, execute a second function related to the first result screen; and
       control the display to display a second result screen, the second result screen corresponding to the second function,
       wherein the controller is configured to control the display to display second content of the second result screen at a substantially center area of the display, the second content is related to the first content of the first result screen, the first content displayed in an end point of the first input.

2. The mobile terminal of claim 1, wherein the first input is a continuous touch input from a bezel region of the display and applied in a first diagonal direction, and
    the second input is a continuous touch input from the end point of the first input and applied in a second diagonal direction that is different from the first diagonal direction.

3. The mobile terminal of claim 1, wherein the controller is configured to scroll the first result screen in response to a holding input applied to the end point of the first input between the first input and the second input.

4. The mobile terminal of claim 3, wherein the controller is configured to control a scroll speed based on at least one of a content display scale of the first result screen and a tilting angle of the mobile terminal.

5. The mobile terminal of claim 1, wherein the controller is configured to control a display scale of content based on at least one of angles or lengths of the first input and the second input when the first function and the second function correspond to functions of controlling content display scale.

6. The mobile terminal of claim 1, wherein the controller is configured to control an indicator for guiding a function corresponding to the first input or the second input, the indicator to be displayed to overlap the first result screen or the second result screen.

7. The mobile terminal of claim 1, wherein the controller is configured to magnify a thumbnail of specific content displayed at a point to which the first input or the second input is applied and to control the magnified thumbnail to be displayed to overlap part of the first result screen or the second result screen.

8. The mobile terminal of claim 1, wherein the controller is configured to repeatedly execute the first function or the second function upon reception of a third input that follows the second input and corresponding to the first input or reception of a fourth input, that follows the third input and corresponding to the second input.

9. The mobile terminal of claim 1, wherein the controller is configured to move the first content to the substantially center area of the display and to control the first content to be displayed at the substantially center area of the display upon reception of the second input having a length less than a predetermined length.

10. The mobile terminal of claim 1, wherein the controller is configured to move the second content to the substantially center area of the display and to control the second content to be displayed at the substantially center area of the display upon reception of the second input having a length longer than a predetermined length.

11. The mobile terminal of claim 10, wherein the controller is configured to display the second content on the overall area of the display upon release of the second input.

12. The mobile terminal of claim 1, wherein the controller is configured to execute the first function or the second function upon reception of the first input or the second input while maintaining a touch input to the bezel region of the display.

13. The mobile terminal of claim 1, wherein, upon reception of a reverse input of the first input or the second input, the controller is configured to recover a previous state before executing the first function or the second function in response to the reverse input.

14. The mobile terminal of claim 1, wherein, when the content is a message, the controller is configured to magnify or reduce the message upon receiving the first input.

15. The mobile terminal of claim 14, wherein the controller is configured to control transparency of the message upon receiving the second input.

16. The mobile terminal of claim 1, wherein the controller is configured to generate a keyword or a representative image with respect to specific content of the first result screen as a tag and to control the tag to be displayed on a specific region of the first result screen when the first input starts from a first bezel region of the display and ends at a second bezel region of the display.

17. A mobile terminal, comprising:
    a display; and
    a controller configured to:
       control the display to display at least one content;
       in response to receiving at first input at the display, execute a first function of controlling a display scale of the content displayed on the display;
       control the display to display a first result screen, the first result screen corresponding to the first function;

in response to receiving a holding input at an end point of the first input, scrolling the first result screen displayed on the display;

in response to receiving a second input that is successively received following the holding input, execute a second function of controlling a display scale of the scrolled first result screen; and control the display to display a second result screen, the second result screen corresponding to the second function, wherein the first function and the second function control the display scales in different manners.

18. The mobile terminal of claim 17, wherein, upon receiving the second input, the controller is configured to display second content of the second result screen, related to first content of the scrolled first result screen, at a substantially center area of the display, the first content corresponding to an end point of the holding input.

19. A method for controlling a mobile terminal, comprising:

displaying at least one content;

receiving a first input at a display;

in response to receiving the first input, executing a first function related to the content displayed on the display;

displaying a first result screen, the first result screen corresponding to the first function;

in response to receiving a second input, executing a second function related to the first result screen; and displaying a second result screen, the second result screen corresponding to the second function, wherein the displaying of the second result screen includes displaying second content of the second result screen in a substantially center area of a screen, the second content is related to the first content of the first result screen, and the first content is displayed at an end point of the first input.

20. A method for controlling a mobile terminal, comprising:

displaying at least one content;

receiving a first input at a display unit;

in response to receiving the first input, executing a first function of controlling a display scale of the content;

displaying a first result screen, the first result screen corresponding to the first function;

receiving a holding input at an end point of the first input;

scrolling the first result screen in response to the holding input;

receiving a second input that is successively received following the holding input;

in response to receiving the second input, executing a second function of controlling display scale of the scrolled first result screen; and displaying a second result screen, the second result screen corresponding to the second function;

wherein the first function and the second function control the display scales in opposite manners.

* * * * *